US012657726B2

(12) United States Patent
Chakraborty et al.

(10) Patent No.: US 12,657,726 B2
(45) Date of Patent: Jun. 16, 2026

(54) SEGMENTING IMAGES FOR VECTOR GRAPHICS RECONSTRUCTION

(71) Applicant: Adobe Inc., San Jose, CA (US)

(72) Inventors: Souymodip Chakraborty, Bangalore (IN); Ankit Phogat, Noida (IN); Vishwas Jain, Bangalore (IN); Jaswant Singh Ranawat, Chittorgarh (IN); Vineet Batra, Pitam Pura (IN); Michal Lukac, San Jose, CA (US); Matthew Fisher, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 156 days.

(21) Appl. No.: 18/436,578

(22) Filed: Feb. 8, 2024

(65) Prior Publication Data

US 2025/0259308 A1 Aug. 14, 2025

(51) Int. Cl.
*G06T 7/11* (2017.01)
*G06T 7/13* (2017.01)
(Continued)

(52) U.S. Cl.
CPC .................. *G06T 7/11* (2017.01); *G06T 7/13* (2017.01); *G06T 7/187* (2017.01); *G06T 7/90* (2017.01);
(Continued)

(58) Field of Classification Search
CPC ... G06T 7/11; G06T 7/13; G06T 7/187; G06T 7/90; G06T 11/001; G06T 11/40;
(Continued)

(56) References Cited

U.S. PATENT DOCUMENTS 7,512,265 B1 * 3/2009 Skirko .................... G06T 7/162
382/162
10,521,889 B2 * 12/2019 Winnemoeller ...... G06T 11/203
(Continued)

OTHER PUBLICATIONS

A. Meijster, J.B.T.M. Roerdink, and W.H. Hesselink. "A General Algorithm for Computing Distance Transforms in Linear Time". In: Mathematical Morphology and its Applications to Image and Signal Processing. Edited by John Goutsias, Luc Vincent, and Dan S. Bloomberg. Boston, MA: Springer US, 2000, pp. 331-340. ISBN: 978-0-306-47025-7. DOI: 10.1007/0-306-47025-X_36. URL: https://doi.org/10.1007/0-306-47025-X_36.
(Continued)

*Primary Examiner* — Alicia M Harrington
*Assistant Examiner* — Christine Yera Ahn
(74) *Attorney, Agent, or Firm* — Keller Preece PLLC

(57) ABSTRACT

One or more implementations include systems, non-transitory computer-readable media, and methods that utilize a segmentation approach that distinguishes between smooth-shaded regions from high-frequency regions in an image within a vectorization pipeline to generate a vector image. For instance, the disclosed systems utilize a smoothing function to identify non-overlapping sets of pixels that include locally smooth pixels and pixels with high frequency details for an image. Furthermore, in some instances, the disclosed systems generate separate sets of fill functions (representing color-based regions) using color-based pixel clustering for the non-overlapping sets of pixels. Moreover, in one or more instances, the disclosed systems merge neighboring color-based regions in the sets of fill functions (using color similarity) to generate a set of segmented regions for an image. In some implementations, the disclosed systems utilize the set of segmented regions, from the image, to generate a vector image from the image.

20 Claims, 16 Drawing Sheets

(51) Int. Cl.
| | |
|---|---|
| *G06T 7/187* | (2017.01) |
| *G06T 7/90* | (2017.01) |
| *G06T 11/10* | (2026.01) |
| *G06T 11/40* | (2006.01) |

(52) U.S. Cl.
CPC .............. *G06T 11/10* (2026.01); *G06T 11/40* (2013.01); *G06T 2207/10024* (2013.01); *G06T 2207/20021* (2013.01); *G06T 2210/32* (2013.01)

(58) Field of Classification Search
CPC . G06T 2207/10024; G06T 2207/20021; G06T 2210/32
See application file for complete search history.

(56) References Cited

U.S. PATENT DOCUMENTS

| | | | | |
|---|---|---|---|---|
| 11,200,708 B1* | 12/2021 | Badhani | | G06T 11/001 |
| 2002/0090133 A1* | 7/2002 | Kim | | G06V 10/267 |
| | | | | 382/164 |
| 2007/0086667 A1* | 4/2007 | Dai | | G06V 30/15 |
| | | | | 382/242 |

OTHER PUBLICATIONS

Cristina Gómez-Polo, María Portillo Muñoz, Mari Cruz Lorenzo Luengo, Purificación Vicente, Purificanción Galindo, and Ana María Martín Casado. "Comparison of the CIELab and CIEDE2000 color difference formulas". In: The Journal of Prosthetic Dentistry 115.1 (2016), pp. 65-70. ISSN: 0022-3913. DOI: https://doi.org/10.1016/j.prosdent.2015.07.001. URL: https://www.sciencedirect.com/science/article/pii/S0022391315003790.

Evgeny Strekalovskiy and Daniel Cremers. "Real-Time Minimization of the Piecewise Smooth Mumford-Shah Functional". In: Computer Vision—ECCV 2014. Edited by David Fleet, Tomas Pajdla, Bernt Schiele, and Tinne Tuytelaars. Cham: Springer International Publishing, 2014, pp. 127-141. ISBN: 978-3-319-10605-2.

"Image Trace," webpage <https://helpx.adobe.com/illustrator/using/image-trace.html>, 12 pages, Aug. 3, 2023, retrieved on Mar. 12, 2024.

Keinosuke Fukunaga and Larry Hostetler. "The estimation of the gradient of a density function, with applications in pattern recognition". In: IEEE Transactions on Information Theory 21.1 (1975), pp. 32-40. DOI: 10.1109/TIT.1975.1055330.

* cited by examiner

Segmented Regions 604

A

806

804

802

812

810

808

SEGMENTING IMAGES FOR VECTOR GRAPHICS RECONSTRUCTION

BACKGROUND

Recent years have seen an increase in the creation and modification of digital content. For instance, individuals and businesses increasingly utilize computing devices to create and modify digital content, such as digital images. Often, computing devices are utilized to vectorize raster images. Indeed, many existing systems can vectorize a raster image by converting a pixel-based image into vector graphic format. Although many existing systems perform raster-to-vector conversions of images, such systems have a number of shortcomings, particularly with regards to efficiently, accurately, and flexibly reconstructing vector graphic format images from raster images.

SUMMARY

This disclosure describes one or more implementations of systems, non-transitory computer-readable media, and computer-implemented methods that solve one or more of the following problems by utilizing a segmentation approach that distinguishes between smooth-shaded regions from high-frequency regions in an image within a vectorization pipeline to generate a vector image. In one or more instances, the disclosed systems determine segmented regions of an image to identify various shapes present in an image (for a raster-to-vector conversion). To generate the segmented regions, in one or more implementations, the disclosed systems utilize a smoothing function to identify non-overlapping sets of pixels that include pixels with smooth color variations (e.g., locally smooth pixels) and pixels with high frequency details (e.g., boundary pixels) for an image. Furthermore, in one or more implementations, the disclosed systems generate separate sets of fill functions (representing color-based regions) using color-based pixel clustering for the non-overlapping sets of pixels. In addition, in one or more instances, the disclosed systems merge neighboring color-based regions in the sets of fill functions (using color similarity) to generate a set of segmented regions for an image. In some instances, the disclosed systems utilize the set of segmented regions, from the image, to generate a vector image from the image.

BRIEF DESCRIPTION OF THE DRAWINGS

The detailed description is described with reference to the accompanying drawings in which.

DETAILED DESCRIPTION

Figure 1:
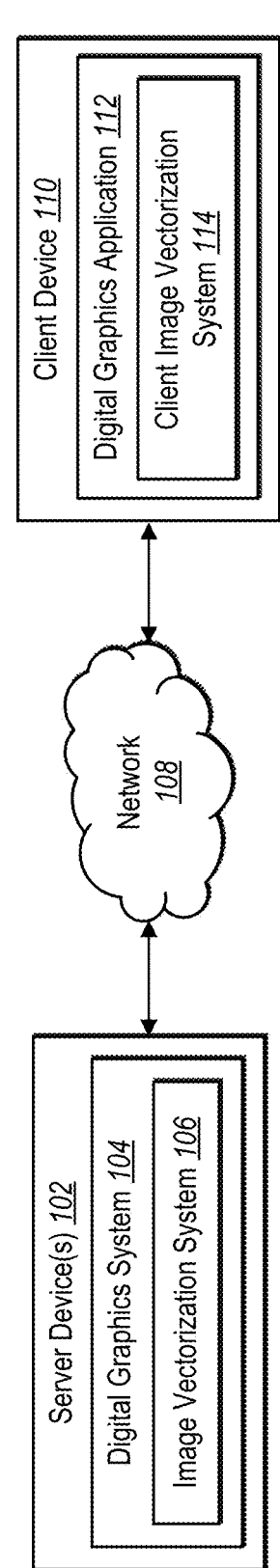
FIG. 1 illustrates a schematic diagram of an example environment in which an image vectorization system operates in accordance with one or more implementations.

This disclosure describes one or more implementations of an image vectorization system that utilizes a segmentation approach that distinguishes between smooth-shaded regions from high-frequency regions in an image to improve vectorization of the image. For example, the image vectorization system generates a set of smooth pixels that represent locally smooth pixel regions and a set of high frequency pixels that represent boundary (or edge) pixels from a digital image. Furthermore, in one or more implementations, the image vectorization system determines a set of fill functions from pixel clusters (based on color values) in the set of smooth pixels and an additional set of fill functions from pixel clusters (based on color values) in the set of high frequency pixels. Additionally, in one or more instances, the image vectorization system utilizes color similarity in the set of fill functions and the additional set of fill functions to determine a set of segmented regions (represented via colored regions) for the digital image. Indeed, in one or more implementations, the image vectorization system utilizes the set of segmented regions to generate a vector image for the digital image.

In one or more embodiments, the image vectorization system converts a raster image into a vector image utilizing a vectorization pipeline. Indeed, in one or more instances, the image vectorization system converts a raster image (e.g., a bitmap or pixel-based image) into a vector graphic format (e.g., a vector image). As part of the vectorization pipeline, in one or more implementations, the image vectorization system utilizes segmentation on a digital image. For example, the image vectorization system, as part of segmentation, identifies various shapes depicted in the digital image to reconstruct segments represented by fill function(s) in vector graphics.

As part of the segmentation process, in one or more implementations, the image vectorization system utilizes a smoothing function for segmentation (e.g., edge detection) and smoothing on a digital image. Indeed, in one or more cases, the image vectorization system utilizes a smoothing function to generates a smooth pixel function and a set of boundary pixels. Moreover, in one or more implementations, the image vectorization system utilizes the smooth pixel function to identify one or more locally smooth pixels (e.g., pixels with less or limited magnitude of color gradients) to generate a set of smooth pixels. Additionally, in one or more implementations, the image vectorization system utilizes the set of boundary pixels to identify one or more boundary (or edge) pixels (e.g., pixels with a high frequency in color values or color gradients) to generate a set of high frequency pixels.

For instance, the image vectorization system generates two non-overlapping sets that include a set of smooth pixels having smooth color variations and a set of high frequency pixels having high frequency details of an image. In some cases, the image vectorization system further dilates the set of boundary pixels to cover anti-aliasing pixels created by high frequency details of an image (for the set of high frequency pixels).

Additionally, in one or more embodiments, the image vectorization system generates two sets of fill functions for the two non-overlapping sets of pixels. For instance, the image vectorization system utilizes pixel clustering based on similar color values (e.g., color clustering) in the set of smooth pixels and the set of high frequency pixels to generate the sets of fill functions. In some cases, the image vectorization system clusters pixels in the set of smooth pixels using color clustering with a first radius (e.g., a small radius) and clusters pixels in the set of high frequency pixels using color clustering with a second radius (e.g., a large radius). Moreover, in one or more instances, the image vectorization system utilizes a constant fill function on the regions created by the pixel clusters in the set of smooth pixels and the set of high frequency pixels (e.g., using representative colors in the regions based on an average color value of pixels in each particular region or cluster). Indeed, in one or more instances, the image vectorization system generates a first set of fill functions that represent colored regions in the set of smooth pixels and a second set of fill functions that represent colored regions in the set of high frequency pixels. In one or more cases, the image vectorization system 106 generates sets of partitions corresponding to the set of fill functions that represent colorized regions of the set of smooth pixels and the set of high frequency pixels.

Moreover, in one or more cases, the image vectorization system generates a set of segmented regions from the set of fill functions. For example, the image vectorization system merges regions (e.g., partitions) corresponding to the set of fill functions based on color similarities to generate a representation of segmented regions for the image (e.g., a set of segmented regions). In particular, in one or more embodiments, the image vectorization system merges neighboring regions corresponding to a set of fill functions based on color similarities of the regions. For instance, the image vectorization system merges neighboring regions that are similar in color (e.g., satisfy a threshold similarity score between colors of the neighboring regions) to reduce over segmentation in the regions (or partitions) represented by the fill functions. In one or more implementations, the image vectorization system also merges neighboring regions between the fill functions to generate a set of segmented regions (e.g., a set of merged fill functions that create segments in an image).

Furthermore, in one or more implementations, the image vectorization system utilizes the set of segmented regions (e.g., represented via segmentation identifiers and/or colors) to generate a vector image. In particular, in one or more instances, the image vectorization system utilizes the set of segmented regions to determine various shapes depicted in the digital (raster) image to reconstruct the segmented regions represented by fill function(s) in vector graphics via mathematical curves, lines, and points that represent the various shapes. In some instances, the image vectorization system automatically (e.g., in the background) generates the segmented regions without user interactions for parameter configurations and/or image tracing configurations. Accordingly, in one or more implementations, the image vectorization system enables text-to-vector workflows that output vector images (e.g., creating an image from a given text prompt via a diffusion model and automatically converting the generated image into vector graphics in accordance with one or more implementations herein).

As mentioned above, many conventional systems suffer from a number of technical deficiencies. For instance, conventional systems often inefficiently reconstruct vector graphic format images from raster images. To illustrate, many conventional systems often utilize image tracing to convert raster images into vectors. However, oftentimes, image tracing in conventional systems often rely on a number of inputs from users with user interfaces having various parameters to configure (e.g., threshold selections, path selections and/or weights, corner weights, noise weight selections) for a sufficient image trace of an image. Indeed, such conventional systems often require a number of selections and user navigations to accomplish a sufficient image trace of a raster image. Furthermore, such image traces often result in complex outputs with an inefficient number of vector paths (e.g., paths that impact graphics processing).

In addition to being inefficient, conventional systems for raster-to-vector conversions are often inflexible. For instance, image tracing in many conventional systems often results in overtly complex outputs having unnecessary details which are difficult to modify or utilize in subsequent workflows. These outputs are often unusable and require substantial computational resources and/or user configuration to utilize the output vector images. In addition, due to image tracing in many conventional systems requiring a number of selections and user navigations to accomplish a sufficient image trace of a raster image, conventional systems often cannot flexibly convert a wide spectrum of raster images. Instead, such conventional systems often require rigid configuration of the image tracing approach on an image-to-image basis (which is inefficient and difficult to scale on a wide range of input images).

Furthermore, conventional systems are also often inaccurate. For example, due to the overtly complex outputs having unnecessary details, many conventional systems fail to accurately generate reconstructions of raster images in vector graphic formats. For instance, some conventional systems generate reconstructions in vector format that include additional details (or lack of details) of the original raster image due to the complexity of outputs in image tracing approaches. In addition, due to a reliance on user configuration, conventional systems often utilize image tracing improperly so that a vector image does not accurately depict a raster image.

The image vectorization system 106 provides a number of advantages relative to these conventional systems. For instance, the image vectorization system improves efficiency in image vectorization workflows. As an example, unlike existing image tracing approaches that often rely on a number of inputs from users to configure various image tracing parameters, the image vectorization system utilizes a segmentation approach that generates clean segments and accurate vector image outputs without user interaction (e.g., a fully automatic workflow with less or no parameters exposed to users). Indeed, in one or more implementations, the image vectorization system utilizes a segmentation approach that generates clean segments while handling noise and artifacts of images for a variety of raster images without configuring parameters specifically for each image. Accordingly, in one or more instances, the image vectorization system segments and vectorizes images automatically to reduce inefficient user configuration of parameters per image and user navigation in many conventional image tracing approaches (i.e., reducing user interaction and navigation within computing devices and/or small screens of mobile devices).

Furthermore, as mentioned above, many conventional systems utilize image tracing approaches that result in complex outputs and an inefficient number of vector paths (that impact graphics processing). In contrast, the image vectorization system utilizes a segmentation approach that generates clean segments that minimize the number of paths to vectorize. Indeed, in many cases, implementations of the image vectorization system reduce a number of paths in vectorized images by three-fold or more while maintaining image quality (e.g., as described in FIG. 8). This reduction in the number paths, from vector images generated by the image vectorization system, improves memory utilization and graphics processing of the vector images.

As a result of less user navigation (or configuration) and output vector images having efficient, clean paths by the image vectorization system, the image vectorization system also improves flexibility in image vectorization. For instance, as a result of the automatic segmentation and vectorization process of the image vectorization system, the image vectorization system operates automatically in the background for a wide variety of raster images. As such, in many cases (and unlike many conventional image tracing approaches), the image vectorization system is easily useable on arbitrary raster images without user configuration of parameters. Furthermore, unlike many conventional systems that require user configuration of parameters, the image vectorization system, in many cases, enables users to vectorize images via small screens of mobile devices via simplified commands (e.g., text-to-image prompts, single click interactions, voice commands) as a result of the image vectorization system automatically segmenting and vectorizing images. In addition, due to the reduction in the number of paths, the image vectorization system, in one or more instances, generates efficient, high-quality vector images that are easy to modify and/or utilize in computer graphic workflows.

Additionally, while improving efficiency and flexibility, the image vectorization system also improves (or maintains) accuracy (or quality) of output vector images. For instance, by distinguishing between smooth shaded regions and high-frequency areas to generate clean segmentations, the image vectorization system enhances control when constructing fill functions and refining segmentation results. As a result, unlike overtly complex outputs of many conventional systems, the image vectorization system generates clean segments that impact the quality of the vector image reconstructions. Indeed, in many instances, the clean segmentations generated by the image vectorization system handle noise, artifacts, and anti-aliasing issues in output vector images. Furthermore, in one or more implementations, the image vectorization system generates accurate vector image outputs while efficiently utilizing a lesser number of paths (e.g., as illustrated in FIG. 8).

Turning now to the figures, FIG. 1 illustrates a schematic diagram of one or more implementations of a system 100 (or environment) in which an image vectorization system operates in accordance with one or more implementations. As illustrated in FIG. 1, the system 100 includes a server device(s) 102, a network 108, and a client device 110. As further illustrated in FIG. 1, the server device(s) 102 and the client device 110 communicate via the network 108.

In one or more implementations, the server device(s) 102 includes, but is not limited to, a computing (or computer) device (as explained below with reference to FIG. 11). As shown in FIG. 1, the server device(s) 102 includes a digital graphics system 104 which further includes the image vectorization system 106. The digital graphics system 104 can generate, store, modify, and/or utilize various digital content items, such as, but not limited to, raster images, vector images, digital videos, and/or generative models for digital images and/or digital videos.

Moreover, as explained below, the image vectorization system 106, in one or more embodiments, utilizes a segmentation approach that distinguishes between smooth-shaded regions from high-frequency regions in an image within a vectorization pipeline. In some implementations, the image vectorization system 106 utilizes a smoothing function to identify non-overlapping sets of pixels that include pixels with smooth color variations (e.g., locally smooth pixels) and pixels with high frequency details (e.g., boundary pixels) for an image. Then, the image vectorization system 106 generates fill functions for the non-overlapping sets of pixels using color clustering. Indeed, in one or more embodiments, the image vectorization system 106 utilizes the fill functions to generate a set of segmented regions for an image. In one or more implementations, the image vectorization system 106 utilizes the set of segmented regions to generate a vector image from the (raster) image.

Furthermore, as shown in FIG. 1, the system 100 includes the client device 110. In one or more implementations, the client device 110 includes, but is not limited to, a mobile device (e.g., smartphone, tablet), a laptop, a desktop, or any other type of computing device, including those explained below with reference to FIG. 11. In certain implementations, although not shown in FIG. 1, the client device 110 is operated by a user to perform a variety of functions (e.g., via the digital graphics application 112). For example, the client device 110 performs functions such as, but not limited to, generating, capturing, modifying, and/or uploading a digital image, segmenting digital images, and/or converting digital images to a vector graphic format.

To access the functionalities of the image vectorization system 106 (as described above), in one or more implementations, a user interacts with the digital graphics application 112 on the client device 110. For example, the digital graphics application 112 includes one or more software applications installed on the client device 110 (e.g., to generate segmentations for images and/or vector image conversions in accordance with one or more implementations herein). In some cases, the digital graphics application 112 is hosted on the server device(s) 102. In addition, when hosted on the server device(s) 102, the digital graphics application 112 is accessed by the client device 110 through a web browser and/or another online interfacing platform and/or tool.

Although FIG. 1 illustrates the image vectorization system 106 being implemented by a particular component and/or device within the system 100 (e.g., the server device(s) 102), in some implementations, the image vectorization system 106 is implemented, in whole or in part, by other computing devices and/or components in the system 100. For example, in some implementations, the image vectorization system 106 is implemented on the client device 110 within the digital graphics application 112 (e.g., via a client image vectorization system 114). Indeed, in one or more implementations, the description of (and acts performed by) the image vectorization system 106 are implemented (or performed by) the client image vectorization system 114 when the client device 110 implements the image vectorization system 106. More specifically, in some instances, the client device 110 (via an implementation of the image vectorization system 106 on the client image vectorization system 114) segments images and/or generates vector images in accordance with one or more implementations herein.

Additionally, as shown in FIG. 1, the system 100 includes the network 108. As mentioned above, in some instances, the network 108 enables communication between components of the system 100. In certain implementations, the network 108 includes a suitable network and may communicate using any communication platforms and technologies suitable for transporting data and/or communication signals, examples of which are described with reference to FIG. 11. Furthermore, although FIG. 1 illustrates the server device(s) 102 and the client device 110 communicating via the network 108, in certain implementations, the various components of the system 100 communicate and/or interact via other methods (e.g., the server device(s) 102 and the client device 110 communicating directly).

Figure 2:
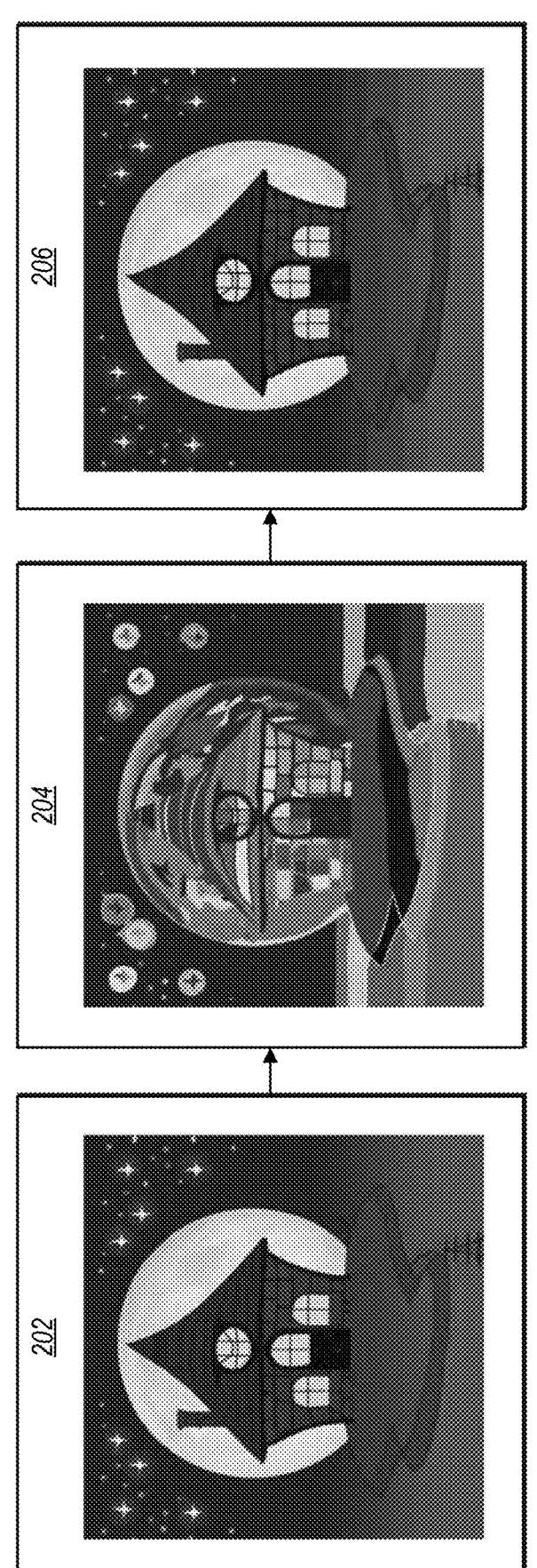
FIG. 2 illustrates an overview of an implementation of an image vectorization system utilizing segmented regions to convert a raster image to a vector image in accordance with one or more implementations.

As mentioned above, in one or more implementations, the image vectorization system 106 utilizes a generated set of segmented regions from a raster image to generate a vector image. For instance, FIG. 2 illustrates an overview of an implementation of the image vectorization system 106 utilizing segmented regions to convert a raster image to a vector image. Indeed, as shown in FIG. 2, the image vectorization system 106 generates a set of segmented regions 204 (e.g., segments represented via colors and/or segment ids) for a raster image 202 in accordance with one or more implementations herein. Subsequently, as shown in FIG. 2, the image vectorization system 106 utilizes the set of segmented regions 204 to reconstruct the raster image 202 as a vector image 206.

In one or more embodiments, an image (sometimes referred to as a digital image) includes a digital symbol, picture, icon, and/or other visual illustration depicting one or more subjects. For instance, an image includes a digital file having a visual illustration and/or depiction of a subject (e.g., human, place, or thing). Indeed, in some implementations, an image includes, but is not limited to, a digital file with the following extensions: JPEG, TIFF, BMP, PNG, RAW, or PDF. In some instances, an image includes a frame from a digital video file having an extension such as, but not limited to the following extensions: MP4, MOV, WMV, or AVI. Although one or more implementations herein describe utilizing the image vectorization system 106 with an image, the image vectorization system 106, in some implementations, vectorizes frames of a digital video.

In addition, in one or more implementations, a raster image (sometimes referred to as a digital raster image) includes a digital image represented through one or more pixels. For example, a raster image (e.g., a bitmap or pixel image) includes an image representation having a grid or other arrangement of pixels that represent colors. Indeed, in one or more implementations, a raster image includes, but is not limited to, a digital file with the following extensions: JPEG, TIFF, BMP, PNG, RAW, or PDF.

Furthermore, in one or more instances, a vector image (sometimes referred to as a digital vector image or digital vector graphic) includes a digital image represented through mathematical equations. In particular, in one or more implementations, a vector image includes paths, points, and curves to represent various shapes and lines to form a depiction within an image. Furthermore, in one or more instances, a vector image includes scalable paths, points, and curves that form an image in various sizes or resolutions (e.g., a resolution-independent image). Indeed, in one or more implementations, a vector image includes, but is not limited to, a digital file with the following extensions: Scalable Vector Graphics (SVG) and/or Adobe Illustrator (AI).

Figure 3A:
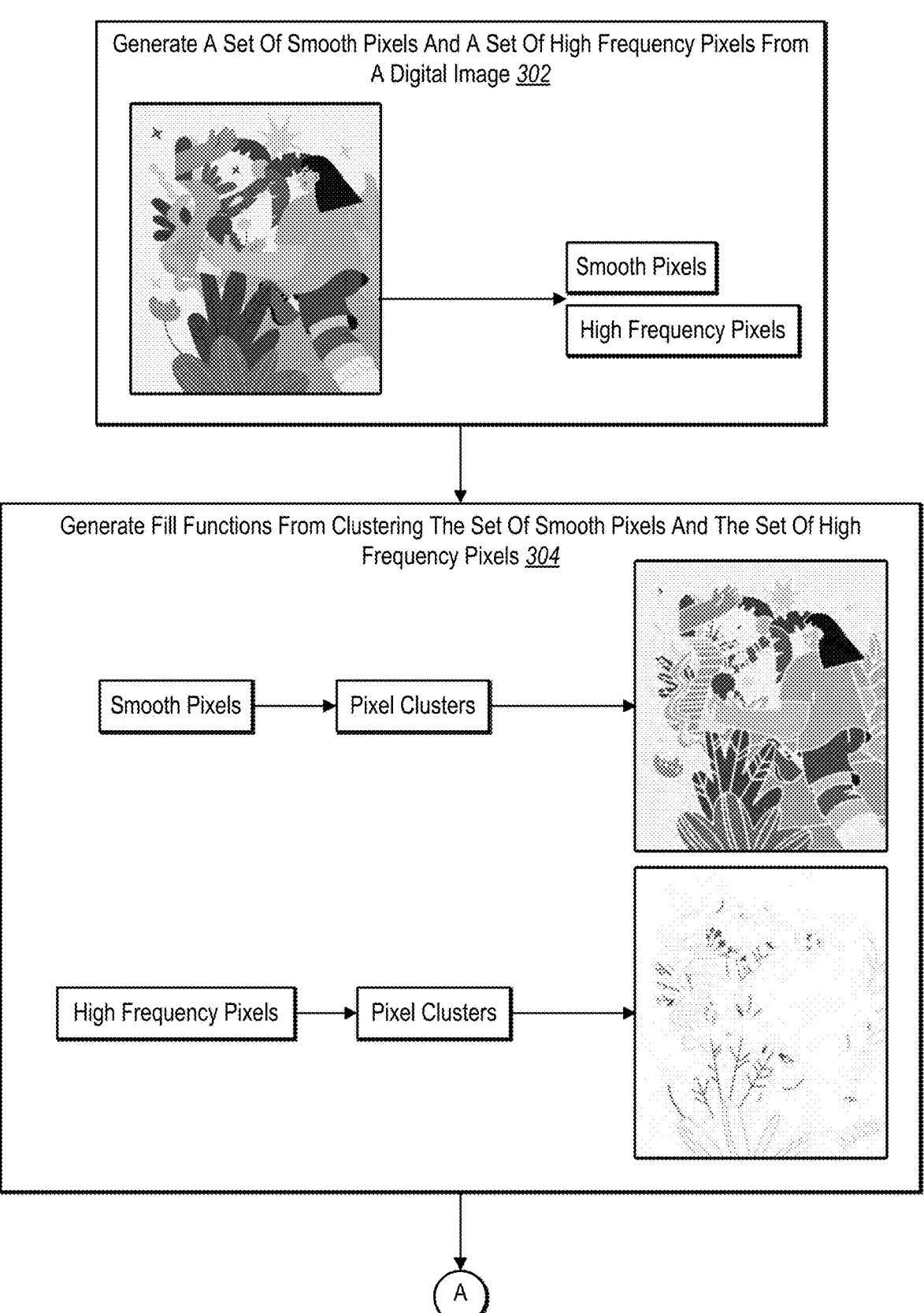
FIGS. 3A-3B illustrate an overview of an image vectorization system utilizing a segmentation approach to vectorize a digital image in accordance with one or more implementations.
Figure 3B:
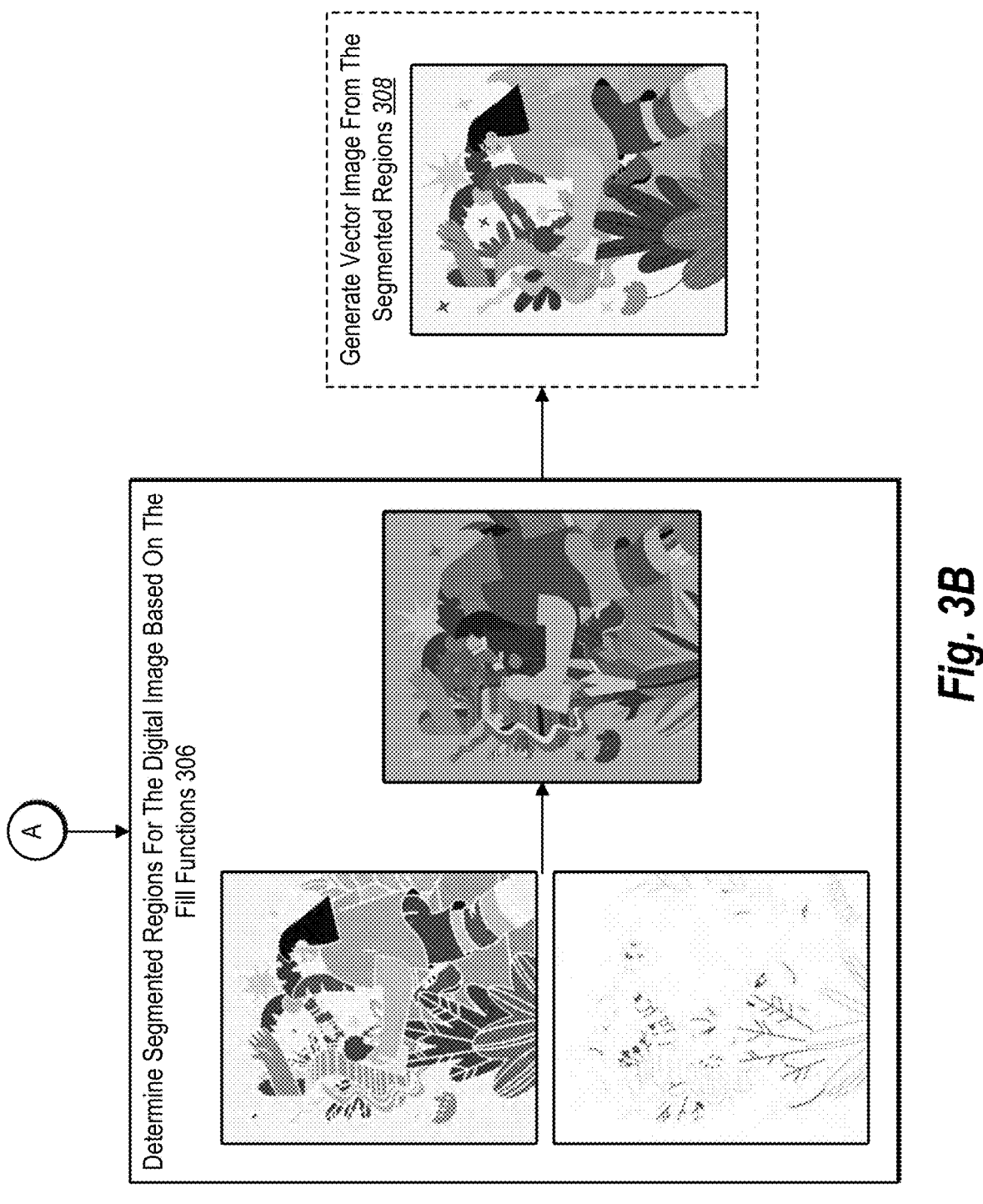

As mentioned above, in one or more instances, the image vectorization system 106 utilizes a segmentation approach that distinguishes between smooth-shaded regions from high-frequency regions in an image within a vectorization pipeline. For example, FIGS. 3A and 3B illustrate an overview of the image vectorization system 106 utilizing the segmentation approach to vectorize a digital image. Indeed, as shown in FIG. 3A, the image vectorization system 106 generates a set of smooth pixels and a set of high frequency pixels from a digital image, generates fill functions from clustering pixels from the set of smooth pixels and clustering pixels from the set of high frequency pixels, and determines segmented regions for the digital image based on the fill functions. Furthermore, as shown in FIG. 3A, in some cases, the image vectorization system 106 generates a vector image from the segmented regions.

As shown in act 302 of FIG. 3A, the image vectorization system 106 generates a set of smooth pixels and a set of high frequency pixels from a digital image. As shown in the act 302, the image vectorization system 106 utilizes a smoothing function to generate two non-overlapping sets that include a set of smooth pixels having smooth color variations and a set of high frequency pixels having high frequency details of an image. Indeed, in one or more implementations, the image vectorization system 106 generates the set of smooth pixels and the set of high frequency pixels from an image as described below (e.g., in reference to FIGS. 4A and 4B).

In one or more embodiments, locally smooth pixels include a collection of (neighboring) pixels of an image that are similar in color value (e.g., a smooth or smooth change in variation in color value between neighboring pixels). In addition, in one or more implementations high frequency pixels include a collection of (neighboring) pixels of an image that have variation in color value (e.g., neighboring pixels that have a frequent change in color values to suggest edge or boundary pixels).

Additionally, in one or more implementations, a smoothing function includes a mathematical model that smooths, segments, and/or denoises an image. In particular, in one or more implementations, the image vectorization system 106 utilizes a smoothing function to separate an image into regions (e.g., via edge detection) while smoothing the boundaries between the regions. For example, a smooth function can include mathematical models, such as, but not limited to, a Mumford-Shah functional, total variation denoising, and/or a Chan-Vese segmentation model.

Moreover, as shown in act 304 of FIG. 3A, the image vectorization system 106 generates fill functions from clustering the set of smooth pixels and the set of high frequency pixels. As shown in the act 304, the image vectorization system 106 generates pixel clusters from the set of smooth pixels and applies constant fill functions to generate a set of fill functions (that represent various colored regions for the locally smooth regions of the image). Moreover, as shown in the act 304, the image vectorization system 106 generates pixel clusters from the set of high frequency pixels and applies constant fill functions to generate a set of fill functions (that represent various color regions for edge or boundary regions of the image). In one or more instances, the image vectorization system 106 utilizes color clustering to generate the pixel clusters from the set of smooth pixels and the set of high frequency pixels. Indeed, the image vectorization system 106 generates fill functions as described below (e.g., in reference to FIGS. 5A and 5B).

In one or more embodiments, a fill function (e.g., a constant fill function) includes a function (or algorithm) that colors (or assigns a color to) an interior of a shape or region of an image. In particular, in one or more implementations, a fill function identifies a cluster of pixels that represent a shape or a region of an image and assigns (or fills) the cluster of pixels with a particular color. In some cases, the image vectorization system 106 utilizes a fill function to color (or assign a color to) a cluster of pixels (representing a shape or region) with a representative color based on color values of pixels within the cluster of pixels. For example, in some cases, the image vectorization system 106 utilizes a representative color that represents an average color value of color values of pixels within the cluster of pixels, a median color value of color values of pixels within the cluster of pixels, and/or a max color value of color values of pixels within the cluster of pixels.

In some instances, the image vectorization system 106 utilizes color clustering to determine pixel clusters for one or more fill functions. For instance, color clustering includes a computer-based technique (e.g., a function, model, machine learning model) that groups pixels into subsets or clusters based on color similarities between the pixels of each cluster. In one or more implementations, color clustering can include clustering approaches, such as, but not limited to, mean-shift color clustering and/or k-means clustering.

Additionally, as shown in act 306 of FIG. 3B, the image vectorization system 106 determines segmented regions for the digital image based on the fill functions. For instance, as shown in the act 306, the image vectorization system 106 utilizes color similarities between fill functions in a set of fill functions to merge neighboring regions that are similar in color (e.g., satisfy a threshold color similarity) to reduce the number of segmented regions. Furthermore, as shown in the act 306, in some instances, the image vectorization system 106 merges the sets of fill functions (e.g., the fill functions for the smooth pixels and the fill functions for the high frequency pixels) to combine neighboring regions similar in color. Indeed, as shown in the act 306, via the merging of fill functions, the image vectorization system 106 generates a set of segmented regions representing various segments in an image as colored regions. Indeed, in one or more instances, the image vectorization system 106 determines a set of segmented regions for the digital image as described below (e.g., in reference to FIGS. 6A and 6B).

In one or more instances, a segmented region includes a representation of a partition (of pixels of an image) that creates a distinct, non-overlapping region (e.g., based on an image property) within an image. For example, a segmented region can represent a partition of an image that represents a shape (e.g., a non-overlapping, distinct shape) defined by boundaries and/or colors. As an example, the image vectorization system 106 generates a set of segmented regions that represent various segmented shapes (or regions) of an image utilizing (distinct) color representations.

In one or more implementations, as shown in act 308 of FIG. 3B, the image vectorization system 106 generates a vector image from the segmented regions (of act 306). Indeed, as shown in the act 308, the image vectorization system 106 utilizes the segmented regions for the image (of the act 302) to generate a vector image. For instance, in reference to the act 308, the image vectorization system 106 generates a vector image that represents the various segmented shapes depicted in the raster image as mathematical curves, lines, and points. In one or more implementations, the image vectorization system 106 generates a vector image as described below (e.g., in reference to FIG. 7).

Figure 4A:
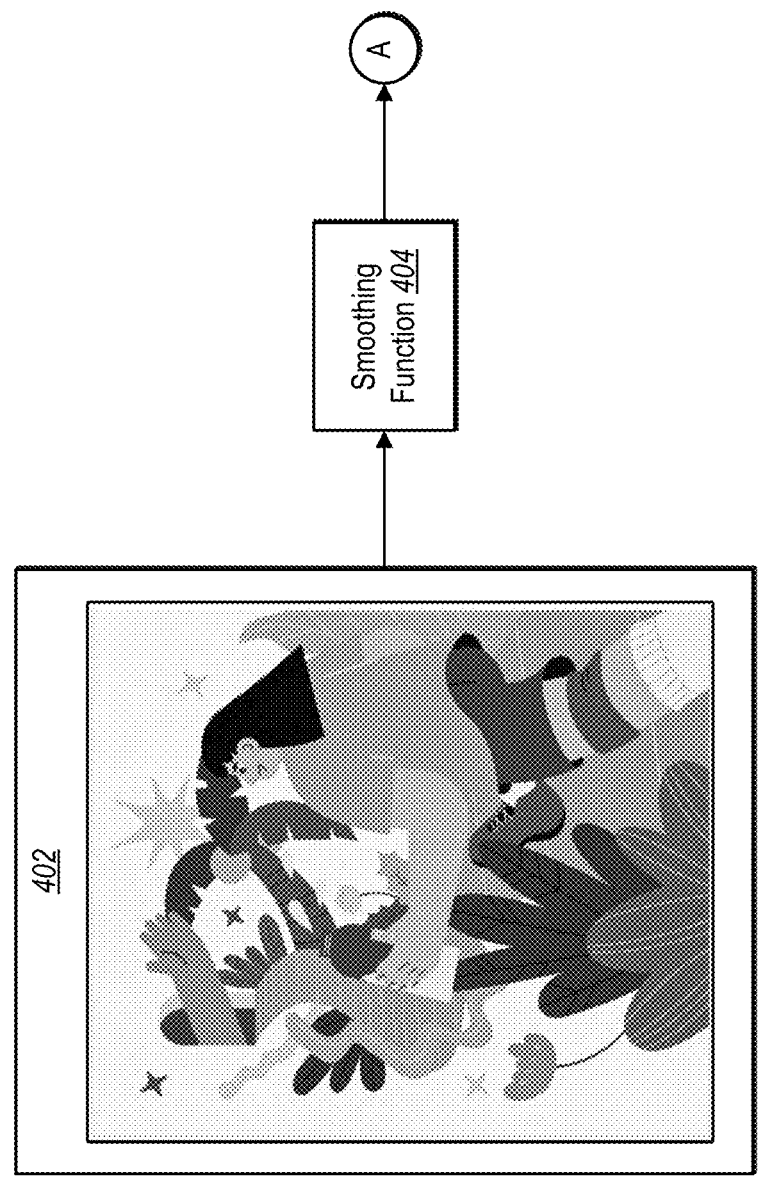
FIGS. 4A-4B illustrate an image vectorization system generating a set of smooth pixels and a set of high frequency pixels from an image in accordance with one or more implementations.
Figure 4B:
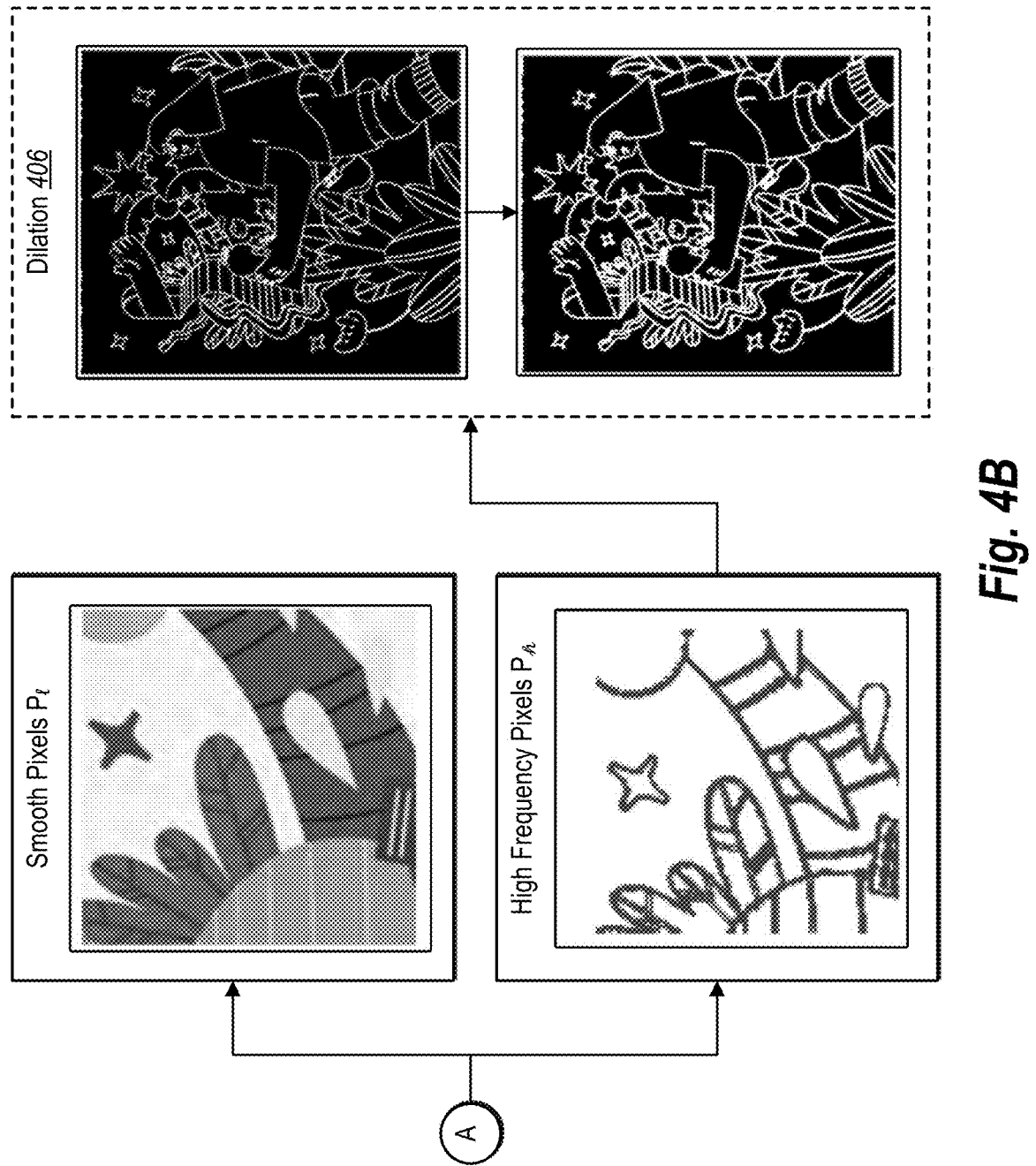

As mentioned above, in one or more instances, the image vectorization system 106 utilizes a smoothing function to generate non-overlapping sets smooth pixels and high frequency pixels. For instance, FIGS. 4A and 4B illustrate the image vectorization system 106 generating non-overlapping sets that include a set of smooth pixels and a set of high frequency pixels. In particular, FIGS. 4A and 4B illustrate the image vectorization system 106 utilizing a smoothing function to identify and generate a set of smooth pixels and a set of high frequency pixels.

As shown in the transition from FIG. 4A to FIG. 4B, the image vectorization system 106 utilizes a raster image 402 with a smoothing function 404 to generate a set of smooth pixels $P_\ell$. As shown in FIG. 4B, the set of smooth pixels $P_\ell$ represent one or more locally smooth pixels (e.g., pixels having limited magnitude of color gradient or variation) from the raster image 402. For instance, as shown in FIG. 4B, the image vectorization system 106 illustrates the set of smooth pixels $P_\ell$ through a crop of the raster image 402 in relation to the smooth pixels $P_\ell$.

Additionally, as shown in the transition from FIG. 4A to FIG. 4B, the image vectorization system 106 also utilizes the raster image 402 with the smoothing function 404 to generate a set of high frequency pixels $P_h$. As shown in FIG. 4B, the set of high frequency pixels $P_h$ represent one or more boundary (or edge) pixels having a high frequency of color value variation from the raster image 402. For example, as shown in FIG. 4B, the image vectorization system 106 illustrates the set of high frequency pixels $P_h$ through a crop of the raster image 402 in relation to the high frequency pixels $P_h$.

In one or more embodiments, to generate the non-overlapping sets of pixels, the image vectorization system 106 utilizes a smoothing function for smoothing and edge detection and partitioning the pixels into a set of smooth pixels and a set of high frequency pixels. For example, the image vectorization system 106 utilizes a smoothing function to generate a set of smooth pixels and a set of high frequency pixels as described below (e.g., in reference to functions (1)-(7)).

To illustrate, in one or more instances, the image vectorization system 106 represents a raster image as a two 2-dimensional array of pixels, where each pixel has three channel colors (e.g., red, blue, green). Indeed, in one or more cases, the image vectorization system 106 represents an image with a height $H \in \mathbb{N}$ and a width $W \in \mathbb{N}$ and one or more pixels identified by the pixels position in the 2-dimensional grid. For example, the image vectorization system 106 defines a set of pixels $P_q$ in accordance with the following function:

$$P_q := [0 \ldots N) \times [0 \ldots W) \qquad (1)$$

Furthermore, within the set of pixels $P_J$ (e.g., a subset of $\mathbb{R}^2$), the image vectorization system 106, in one or more instances, represents a raster image as a mapping of pixels to colors in accordance with the following function:

$$\mathcal{J} : P_J \to \mathbb{R}^3 \qquad (2)$$

In some cases, the image vectorization system 106 further identifies adjacency of pixels utilizing a connectivity criterion. For example, in 4-connected criteria, the image vectorization system 106 defines that a pixel (i, j) is adjacent to four pixels {(i−1, j), (i+1, j), (i, j−1), (i, j+1)}. As another example, in an 8-connected setting, the image vectorization system 106 defines that a pixel (i, j) is adjacent to eight pixels {(i−1, j), (i+1, j), (i, j−1), (i, j+1), (i−1, j−1), (i+1, j−1), (i+1, j+1), (i+1, j−1)}.

Moreover, in one or more instances, the image vectorization system 106 defines a path as a sequence of pixels $(p_1, \ldots, p_n)$ such that, for each pixel $p_i$ in the sequence of pixels is adjacent to a pixel $p_{i-1}$ and pixel $p_{i+1}$ (if the pixel exists). Furthermore, in one or more instances, the image vectorization system 106 determines that a subset of P (e.g., set of pixels of an image) is connected, if for each pair of pixels in the subset there is a path from one pixel to the other pixel such that each pixel in the path belongs to the subset.

Additionally, in one or more implementations, the image vectorization system 106 defines a segmentation of an image as a map from pixels to natural numbers $\mathbb{N}$ in accordance with the following function:

$$S_J : P_J \to \mathbb{N} \qquad (3)$$

In the above mentioned function (3), the image vectorization system 106 assigns each pixel to a non-negative number as a segment identifier (e.g., to represent a distinct segmentation region). In some cases, the segment identifier includes a color value.

Moreover, in some cases, the image vectorization system 106 defines a partition $P_t$ of pixels induced by a segmentation as the equivalence class defined by the equivalence relation through having a same segmentation identifier in accordance with the following function:

$$P_t := \{\{p \in P_J : S_{(p)} = n\} : n \in \mathbb{N}\} \qquad (4)$$

In some instances, in reference to the above-mentioned function (4), the image vectorization system 106 identifies a set of segmentations $S$ and a partition $P_t$ as equivalent (e.g., $S$ is derived from $P_t$ and vice-versa). Indeed, in one or more implementations, the image vectorization system 106 identifies each element of the partition $P_t$ and/or $S$ (having a same segmentation identifier) as a (segmented) region.

As mentioned above, in one or more implementations, the image vectorization system 106 utilizes a smoothing function to generate a set of smooth pixels and a set of high frequency pixels (e.g., from a set of pixels $P_J$). For instance, in some cases, the image vectorization system 106 utilizes a Mumford-Shah functional as the smoothing function. Indeed, in one or more implementations, the image vectorization system 106 utilizes the Mumford-Shah functional to determine a fill function and a set of boundary pixels that represent smooth pixels and high frequency, boundary pixels for an image (e.g., to identify partitioned regions separated by boundaries via smoothing and edge detection).

In one or more implementations, the image vectorization system 106 utilizes a Mumford-Shah functional for an image $\mathcal{J}$ in accordance with the following function:

$$E_J[f] := \alpha \sum_{x \in P_J} (f(x) - \mathcal{J}(x))^2 + \beta \sum_{B(x)=0} (\nabla f(x))^2 + \gamma \sum_{B(x)=1} 1 \qquad (5)$$

In reference to the above-mentioned function (5), in one or more instances, the image vectorization system 106 utilizes a fill function $f:\overline{B} \to \mathbb{R}^3$ defined on a set $\overline{B} \subseteq P_J$. Moreover, in one or more implementations, the image vectorization system 106 determines a minimum solution for the functional $E_J$ that defines the fill function $f$ and a corresponding boundary B. In one or more instances, as part of the function (5), the image vectorization system 106 defines a reconstruction loss (e.g., the first component of function (5)), utilizes the second component of the function (5) to create a function $f$ that is local constant, and utilizes the third component of the function (5) to reduce a number of pixels marked (or determined) as boundary (or edge) pixels.

Furthermore, in reference to the Mumford-Shah functional of function (5) above, in one or more implementations, the image vectorization system 106 determines (or seeks) a solution in terms of $f$ (e.g., a functional representation of the image) and B (e.g., boundary pixels) that minimizes the functional $E_J$. In addition, in one or more cases, the image vectorization system 106 utilizes hyper parameters $\alpha$, $\beta$, and $\gamma$ to modify a goal of the functional $E_J$. For example, the image vectorization system 106 utilizes $\gamma$ values to modify a number of pixels marked as boundary pixels (e.g., increasing $\gamma$ reduces the number of pixels that are marked as boundary pixels). In addition, in some instances, the image vectorization system 106 utilizes $\beta$ values to affect the function $f$ (e.g., increasing $\beta$ causes $f$ to be more locally constant). In some cases, the image vectorization system 106 utilizes a graphical processing unit (GPU) version of the Mumford-Shah functional of function (5).

In one or more instances, the image vectorization system 106 solves the Mumford-Shah functional (from function (5)) with respect to an image to generate a function $f$ and a boundary B. For instance, the image vectorization system 106 utilizes the Mumford-Shah functional (from function (5)) to generate a non-constant function $f$ that is locally smooth. Moreover, in one or more instances, the image vectorization system 106 utilizes the Mumford-Shah functional (from function (5)) to generate a boundary set B that is not closed and includes pixels in areas where a high frequency of color values is inferred (or determined).

Indeed, in one or more cases, a set of pixels in the boundary set B includes pixels in regions that correspond to a large magnitude of color gradients. For example, the set of pixels in the boundary set B include pixels in an area that corresponds to a variation or change in color that satisfies a threshold frequency (e.g., greater than or equal to a frequency) or an area corresponding to a fill function having high variation (e.g., high reconstruction loss). Indeed, in one or more implementations, the image vectorization system 106 determines, via the function (5) when each part of an image is treated equally, the boundary set of pixels B as pixels in an area that corresponds to a domain of a constant fill function having a high reconstruction loss (e.g., greater than or equal to a threshold reconstruction loss).

Furthermore, in one or more cases, the image vectorization system 106 generates the two non-overlapping sets that include a set of smooth pixels and a set of high frequency pixels. For instance, the image vectorization system 106 divides the set of pixels P (e.g., from functions (1)-(5) above) into two non-overlapping sets of pixels based on the function $f$ and the boundary B from the Mumford-Shah functional (from function (5)). For instance, the image vectorization system 106 divides the set of pixels P into non-overlapping sets of pixels $P_\ell$ (e.g., a set of smooth pixels having smooth color variations) and $P_h$ (e.g., a set of high frequency pixels having high frequency details of the image). In some cases, the image vectorization system 106 determines the set of high frequency pixels $P_h$ from the set of boundary pixels B (e.g., determined in accordance with function (5) and determines the set of smooth pixels $P_\ell$ as pixels from the set of pixels P that are not in the set of boundary pixels B.

As also shown in FIG. 4B, the image vectorization system 106, in some cases, utilizes dilation (in box 406) on the non-overlapping pixels to account for anti-aliasing pixels generated within high-frequency detail areas of a digital image (e.g., shown as an expanded boundary from the image 402 in the box 406). For instance, the image vectorization system 106 dilates a set of boundary pixels B (for the high frequency pixels $P_h$) obtained utilizing a smoothing function (e.g., the Mumford-Shah function in function (5)). Indeed, in one or more cases, the image vectorization system 106 dilates the set of boundary pixels B by expanding the set of boundary pixels B to include pixels within a distance from pixels in the set of boundary pixels B. In one or more cases, the image vectorization system 106 dilates the set of boundary pixels B to cover anti-aliasing pixels created by high frequency details near the set of boundary pixels B (e.g., for the set of high frequency pixels $P_h$).

In some cases, the image vectorization system 106 utilizes a distance between pixels to dilate the set of boundary pixels B (e.g., for the set of high frequency pixels $P_h$). For example, the image vectorization system 106 utilizes a Manhattan-distance field M of B to dilate the set of boundary pixels B. Indeed, in one or more instances, the image vectorization system 106 utilizes a hyper-parameter $\tau \in \mathbb{R}$ to dilate the set of boundary pixels B (e.g., a dilation of B as Ba) in accordance with the following function:

$$B_d := \{p \in P_q : M(p) \leq \tau\} \tag{6}$$

For instance, in reference to the function (6), the image vectorization system 106 generates a dilated set of boundary pixels $B_d$ that includes the set of boundary pixels B and a set of pixels that have a distance from the pixels in B that is less than (or less than or equal to) the hyper-parameter t.

In some cases, the image vectorization system 106 utilizes a Manhattan-distance field. Although one or more implementations illustrate utilizing a Manhattan distance, the image vectorization system 106, in one or more instances, utilizes various distances, such as, but not limited to, Euclidean distance.

Furthermore, in one or more instances, the image vectorization system 106 determines non-overlapping sets of pixels (e.g., the set of high frequency pixels $P_h$ and the set of smooth pixels $P_\ell$) from dilated set of boundary pixels $B_d$. For example, the image vectorization system 106 determines the set of high frequency pixels $P_h$ from dilated set of boundary pixels $B_d$ and determines the set of smooth pixels $P_\ell$ as pixels from the set of pixels P that are not in the dilated set of boundary pixels $B_d$. To illustrate, in some instances, the image vectorization system 106 determines the non-overlapping set of smooth pixels $P_\ell$ and the set of high frequency pixels $P_h$ using the dilated set of boundary pixels $B_d$ in accordance with the following function:

$$P_\ell := P_q \backslash B_d \text{ and } P_h := B_d \tag{7}$$

Indeed, as mentioned above, in one or more implementations, the image vectorization system 106 utilizes a set of smooth pixels $P_\ell$ having pixels that are locally smooth.

Figure 5A:
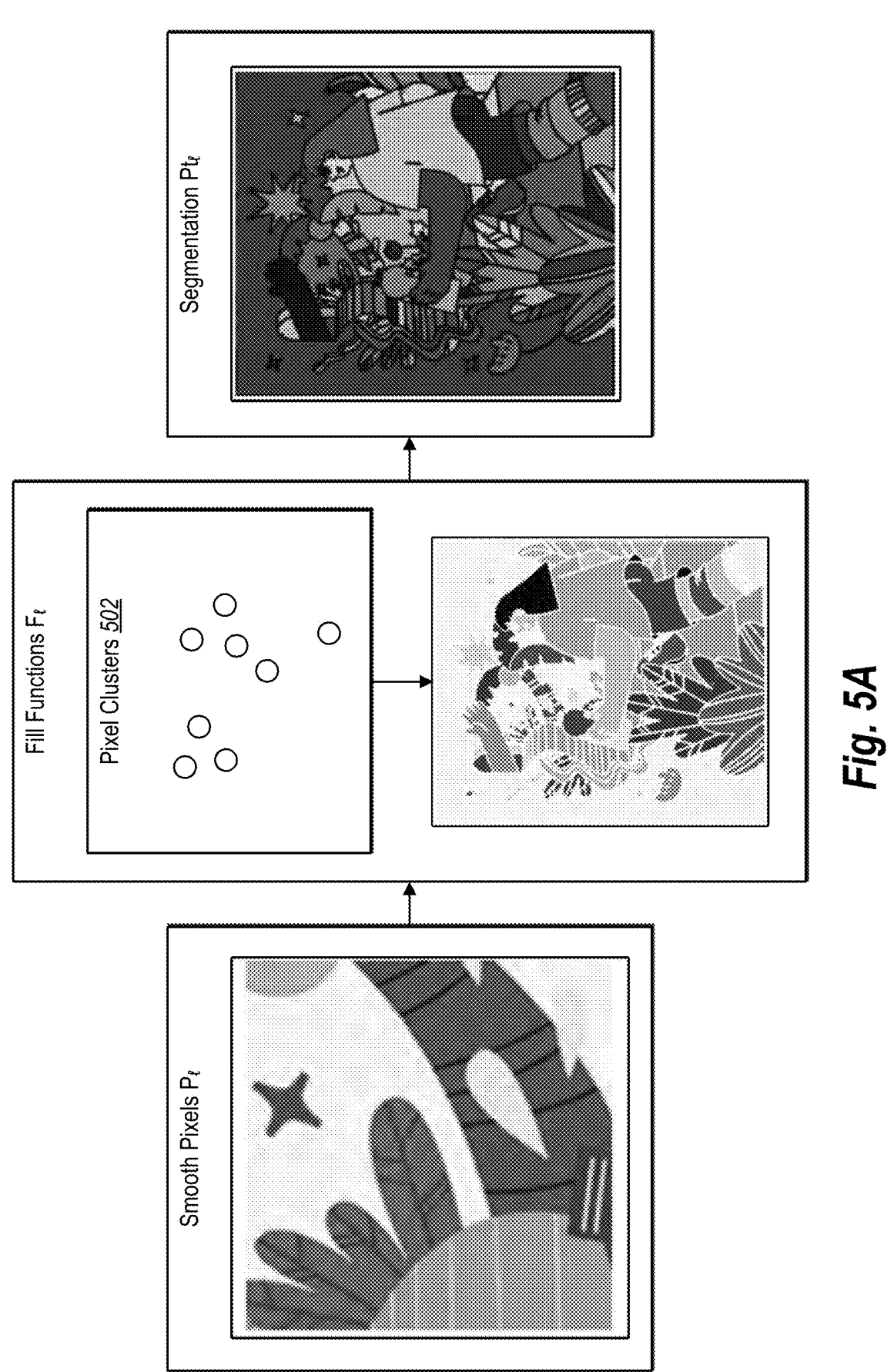
FIGS. 5A-5B illustrate an image vectorization system generating fill functions from a set of smooth pixels and a set of high frequency pixels in accordance with one or more implementations.
Figure 5B:
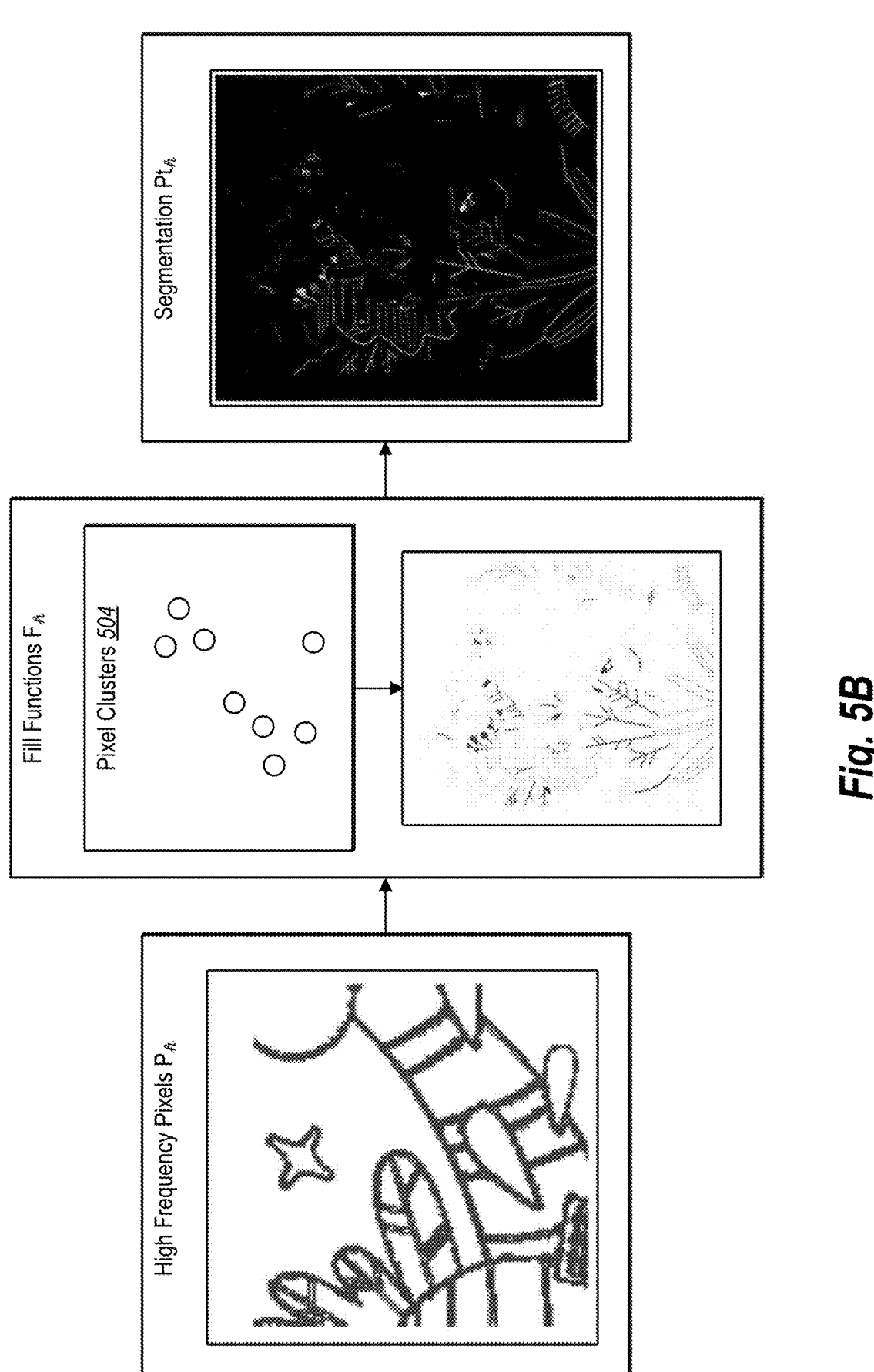

As mentioned above, in one or more implementations, the image vectorization system 106 generates fill functions (from the set of smooth pixels and the set of high frequency pixels). For instance, FIGS. 5A and 5B illustrate the image vectorization system 106 generating fill functions from the set of smooth pixels and the set of high frequency pixels. In particular, FIGS. 5A and 5B illustrate the image vectorization system 106 utilizing pixel clustering to generate fill functions for the set of smooth pixels and the set of high frequency pixels.

As shown in FIG. 5A, the image vectorization system 106 utilizes pixel clustering with a set of smooth pixels $P_\ell$ to generate a set of fill functions $F_\ell$ (from pixel clusters 502). Indeed, in one or more implementations, the image vectorization system 106 clusters pixels in the set of smooth pixels $P_\ell$ based on colors (e.g., color clustering). Furthermore, as shown in FIG. 5A, the image vectorization system 106 utilizes a constant fill function on the regions created by the pixel clusters in the set of smooth pixels $P_\ell$ to generate a set of fill functions $F_\ell$ that represent distinct regions in the set of smooth pixels $P_\ell$ with (different) colors.

Furthermore, as also shown in FIG. 5B, the image vectorization system 106 utilizes pixel clustering with a set of high frequency pixels $P_h$ to generate a set of fill functions $F_h$ (from pixel clusters 504). In one or more cases, the image vectorization system 106 clusters pixels in the set of high frequency pixels $P_h$ based on colors (e.g., color clustering). Moreover, as shown in FIG. 5B, the image vectorization system 106 utilizes a constant fill function on the regions created by the pixel clusters in the set of high frequency pixels $P_h$ to generate a set of fill functions $F_h$ (representing different edges or regions in the set of high frequency pixels $P_h$ with colors).

In one or more cases, the image vectorization system 106 utilizes pixel clustering (e.g., color clustering) to identify clusters of pixels within the set of smooth pixels $P_\ell$ and clusters of pixels within the set of high frequency pixels $P_h$. For instance, the image vectorization system 106 generates pixel clusters by identifying neighboring pixels to a pixel that are similar in color (and within a particular radius). Moreover, in one or more instances, the image vectorization system 106 utilizes a constant fill function on each region (e.g., pixel cluster) to identify a representative color for the region (e.g., using an average pixel color, a weighted average pixel color, median pixel color from the pixel cluster) and assigns the representative color to the pixel cluster (or region). Indeed, in one or more implementations, the image vectorization system 106 generates a set of fill functions for pixel clusters in the set of smooth pixels $P_\ell$ and a set of fill functions for pixel clusters in the set of high frequency pixels $P_h$.

For example, the image vectorization system 106 utilizes constant fill functions and pixel clustering to generate a set of fill functions for the smooth pixels and a set of fill functions for the high frequency pixels as described below (e.g., in reference to functions (8)-(19)).

To illustrate, in some cases, the image vectorization system 106 utilizes a fill function (as a set of tuples of functions) in accordance with the following function:

$$F := \{ f \mid f \colon B \to \mathbb{R}^3, B \subseteq \mathbb{R}^2 \} \qquad (8)$$

In the function (8), in one or more instances, the image vectorization system 106 represents a color function $f$ as a mapping from points in $\mathbb{R}^2$ to a color space $\mathbb{R}^3$ (with a domain of $f$ as B). In one or more implementations, the image vectorization system 106 represents $\partial B$ as a boundary of B and the domain of a function as $\mathrm{Dom}(f)$.

Furthermore, in one or more instances, the image vectorization system 106 utilizes a fill function over a discrete domain of the set of pixels $P_{\mathcal{J}}$ for the image $\mathcal{J}$ in accordance with the following function:

$$F_{\mathcal{J}} := \{ f \mid f \colon B \to \mathbb{R}^3, B \subseteq P_{\mathcal{J}} \} \qquad (9)$$

In the function (9), in one or more implementations, the image vectorization system 106 utilizes a boundary of the domain B of $f$ as a binary function $\partial B \colon P_{\mathcal{J}} \to \{0,1\}$ which marks the boundary pixels of the region B. Additionally, in one or more embodiments, the image vectorization system 106 utilizes a set of functions F with a domain $\mathrm{Dom}(F) = \cup_{f \in F} \mathrm{Dom}(f)$ and image $\mathbb{R}^3$. For instance, the image vectorization system 106 determines a set of functions F in accordance with the following function:

$$F(p) = \sum_{\substack{f \in F \\ p \in Dom(f)}} f(p) \qquad (10)$$

Additionally, in one or more instances, the image vectorization system 106 utilizes a constant fill function, with a color (parameter) $\theta \in \mathbb{R}^3$, in accordance with the following function:

$$F_\theta \colon \beta \to \mathbb{R}^3 \text{ is defined as } F_\theta(x) = \theta \qquad (11)$$

In one or more implementations, the image vectorization system 106 utilizes fill functions F for segmentation for the purpose of vectorization (e.g., constant fill vectorization). For example, the image vectorization system 106 utilizes fill functions that are constant functions, domains of the functions are non-overlapping, and the domain of the fill function is connected. In addition, in one or more instances, the image vectorization system 106 identifies fill functions in which the size of the set of fill functions F is reduced in size (e.g., minimized, small) while domains are increased in size (e.g., maximized, large) in accordance with the following function:

$$\min_F \left( \alpha \sum_{p \in P_{\mathcal{J}}} \| \mathcal{J}(p) - F(p) \|_2 + \beta \sum_F 1 \right) \qquad (12)$$

Indeed, in one or more implementations, the image vectorization system 106 generates a set of fill functions $F := \{ f_1, \ldots, f_n \}$ in which the set of domain creates a partition $P_r := \{ \mathrm{Dom}(f_1), \ldots, \mathrm{Dom}(f_n) \}$ (e.g., a segmentation $\mathcal{S}$) as described herein (e.g., with reference to functions (4) and (8)-(12)).

As mentioned above (and illustrated in FIGS. 5A and 5B), in some instances, the image vectorization system 106 utilizes pixel clustering to generate two sets of fill functions $F_\ell$ and $F_h$ for the two non-overlapping sets of pixels (e.g., the set of smooth pixels $P_\ell$ and the set of high frequency pixels $P_h$). For example, in some cases, the image vectorization system 106 utilizes mean-shift color clustering to cluster pixels with similar color values in the set of smooth pixels $P_\ell$ and the set of high frequency pixels $P_h$. In one or more cases, the image vectorization system 106 utilizes a highly parallelizable mean-shift color clustering approach that handles each pixel in isolation. In addition, in one or more cases, the image vectorization system 106 utilizes separate radii for the set of smooth pixels $P_\ell$ and the set of high frequency pixels $P_h$ while clustering to account for regions with higher frequency of color change versus regions with smooth pixels.

For instance, the image vectorization system 106 clusters pixels based on color for a set of smooth pixels $P_\ell$ using a first radius $r_\ell$ to obtain a set of partitions $P_{t_\ell}$, using mean shift color clustering (with a connected component partition (ccc) algorithm) in accordance with the following function:

$$P_{t_\ell} := ccc \circ meanshift(P_\ell, r_\ell) \qquad (13)$$

Furthermore, in one or more implementations, the image vectorization system 106 clusters pixels based on color for a set of high frequency pixels $P_h$ using a second radius $r_h$ to obtain a set of partitions $P_{t_h}$ using mean shift color clustering (with a connected component partition (ccc) algorithm) in accordance with the following function:

$$P_{t_h} := ccc \circ meanshift(P_h, r_h) \qquad (14)$$

In some cases, the image vectorization system 106 utilizes a small radius (as the first radius $r_\ell$) to capture smooth transition of colors within the clusters (or partitions) in the set of smooth pixels $P_\ell$. Moreover, in one or more implementations, the image vectorization system 106 utilizes a large radius (as the second radius $r_h$) to capture high frequency of colors within the clusters (or partitions) in the set of high frequency pixels $P_h$. For instance, in some cases, the image vectorization system 106 utilizes a first radius $r_\ell$ that is smaller than the second radius $r_h$.

Furthermore, upon determining a set of partitions $P_{t_\ell}$ (e.g., pixel clusters) for the smooth pixels $P_\ell$ and a set of partitions $P_{t_h}$ (e.g., pixel clusters) for the high frequency pixels $P_h$, in one or more implementations, the image vectorization system 106 utilizes a constant fill function to generate the sets of fill functions $F_\ell$ and $F_h$. For instance, the image vectorization system 106 fits a constant fill function $f$ on each region of the partitions (e.g., within each cluster of the set of partitions $P_{t_\ell}$ and the set of partitions $P_{t_h}$). In some instances, the image vectorization system 106 fits a constant fill function $f$ by capturing a representative color of each region of the partitions.

Then, in one or more implementations, the image vectorization system 106 utilizes representative colors of each In reference to functions (13)-(15), in one or more instances, the image vectorization system 106 utilizes a mean shift color clustering algorithm. For instance, the image vectorization system 106 utilizes a mean shift color clustering algorithm in accordance with the following algorithm:

---

Algorithm 1

---

Require: P is a set of pixels, r radius, $\epsilon$ stopping threshold, $\mu$ merging range
Ensure: A partition $P_t = \{P_1, \ldots, P_n\}$
   $P' + \emptyset$
   for $p \in P$ do
      $p' \leftarrow p$
      $q \leftarrow \text{mean}\{q \in P: \|q - p'\|_2 \le r$      ▷ Use AABB tree for 3d-range search
      while $\|p' - q\|_2 \le \epsilon$ do
         $p' \leftarrow q$
         $q \leftarrow \text{mean}\{q \in P : \|q - p'\|_2 \le r$    ▷ Use AABB tree for 3d-range search
      $P' \leftarrow P' \cup \{p'\}$ $$P_t \leftarrow \left\{ P \subseteq P': \underset{p,q \in P'}{\forall} \|p - q\|_2 \le \mu \right\}$$

--- region of the partitions to fill (or assign) the representative colors in each region to generate the set of fill functions $F_\ell$ and $F_h$. Indeed, as mentioned above, in one or more cases, the image vectorization system 106 utilizes a mean color value and/or a median color value within each region represented in the set of partitions $P_{t_\ell}$ and the set of partitions $P_{t_h}$. In some implementations, the image vectorization system 106 weights the representative color based on properties of pixels within each region represented in the set of partitions $P_{t_\ell}$ and the set of partitions $P_{t_h}$ (e.g., weighting the mean color value by pixel distances to boundaries, weighting the mean color value by local pixel smoothness).

As an example, in one or more instances, the image vectorization system 106 fits a constant fill function $f$ on each region using a weighted average color in each of the regions of the set of partitions $P_{t_\ell}$ and the set of partitions $P_{t_h}$. For instance, the image vectorization system 106 utilizes a weighted average to weight against pixels near the set of boundary pixels (or edge pixels) B (e.g., due to anti-aliasing). For example, the image vectorization system 106 determines a weight for a pixel using a Manhattan distance field M, which utilizes a lesser weight for pixels closer to the set of boundary pixels B. For instance, in a region $R \in P_t$, the image vectorization system 106 utilizes a constant fill function to generate a representative color in accordance with the following:

$$f: R \to \{c\} \text{ where } c := \frac{\sum_{p \in R}(M(p) + \epsilon^{\eta p}) \cdot \mathcal{f}(p)}{\sum_{p \in R}(M(p) + \epsilon^{\eta p})} \tag{15}$$

In the function (15), in one or more implementations, the image vectorization system 106 utilizes a count of the number of neighbor pixels of pixel p in region R with a constant $\epsilon$ (e.g., a constant greater than 1). In one or more instances, the image vectorization system 106 handles a case when the Manhattan distance is zero in the constant fill function of function (15) to determine a weighted color average. Although one or more embodiments describe utilizing a Manhattan distance, the image vectorization system 106, in one or more instances, utilizes a variety of distance determinations, such as, but not limited to, a Euclidian distance.

In one or more instances, the image vectorization system 106 utilizes a mean shift color clustering approach as described in K. Fukunaga et. al., The Estimation Of The Gradient Of A Density Function, With Applications In Pattern Recognition, IEEE Transactions on Information Theory 21.1 (1975), pages 32-40, DOI: 10.1109/TIT.1975.1055330. Although one or more implementations describe utilizing mean shift color clustering, the image vectorization system 106, in some cases, utilizes various clustering approaches, such as, but not limited to, k-means clustering.

Moreover, in one or more instances, the image vectorization system 106 utilizes a connectivity equivalence relation to ensure that the resulting partitions (or clusters) of pixels are connected. For instance, the image vectorization system 106 utilizes a connectivity equivalence relation ~ in accordance with the following function:

$$p \sim P_t p' \text{ iff there exists a path } \{p, q_1, \ldots, q_n, p'\}, \tag{16}$$

$$\text{where } \forall_{q_i} \mathcal{S}(q_i) = \mathcal{S}(p) = \mathcal{S}(p')$$

Indeed, in one or more instances, the image vectorization system 106 utilizes a graph traversal approach (e.g., in a planar graph) to create connectivity equivalence relations. For instance, in some cases, the image vectorization system 106 creates an equivalence class for the connectivity equivalence relation ~ utilizing the following Algorithm 2 (Breadth First Search) and Algorithm 3 (Connected Component Partition).

---

Algorithm 2

---

Require: Pixel p, V : P' → {0,1}, $\mathcal{S}$ : P' → ℕ
Ensure: A := {p'|p~p' and $\mathcal{S}$ (p') = $\mathcal{S}$ (p)}
   $Q \leftarrow$ [p]
   $A \leftarrow \phi$
   while $Q \ne \phi$ do
      $s \leftarrow Q$.pop( )
      V(s) = 1
      for $q \in$ adjacent(s) do
         if V (q) = 0 and $\mathcal{S}$ (q) = $\mathcal{S}$ (p) then -continued

---

Algorithm 2

---

Q.push(q)
A < A ∪ {q}

---

---

Algorithm 3

---

Require: A segmentation $\mathcal{S}$ : P' → ℕ, P' is a set of pixels.
Ensure: A partition $P_t$ = {$P_1$, . . ., Pn}, where ∀$P_i$ is connected.
   V : P' → {0,1}, initialized as ∀$_p$V(p) = 0
   $P_t$ ← Ø
   for p ∈ P' do
      if V(p) = 0 then
         $P_t$ ← $P_t$ ∪ bfs(p, V, $\mathcal{S}$ )

---

Indeed, in one or more cases, the image vectorization system 106 generates separate sets of segmentation partitions for the set of smooth pixels $P_\ell$ and the set of high frequency pixels $P_h$. For instance, as described above (e.g., in reference to functions (13)-(15) and algorithms 1-3), the image vectorization system 106 generates a set of partitions (or regions) colorized using a set of fill functions for each of the set of smooth pixels $P_\ell$ and the set of high frequency pixels $P_h$. For example, as shown in FIG. 5A, the image vectorization system 106 generates a set of (segmentation) partitions $P_{t_\ell}$, corresponding to a set of fill functions $F_\ell$ using mean shift color clustering and constant fill functions on the set of smooth pixels $P_\ell$. Moreover, as also shown in FIG. 5B, the image vectorization system 106 generates a set of (segmentation) partitions Pty corresponding to a set of fill functions $F_h$ using mean shift color clustering and constant fill functions on the set of smooth pixels $P_h$.

As mentioned above, in one or more implementations, the image vectorization system 106 generates a set of segmented regions for a digital image based on a set of fill functions (and corresponding partitions) determined for the image. Indeed, in one or more instances, the image vectorization system 106 merges regions (e.g., partitions) corresponding to the set of fill functions based similarities to generate the set of segmented regions. For instance, FIGS. 6A-6B illustrates the image vectorization system 106 generating a set of segmented regions by merging fill functions.

Figure 6A:
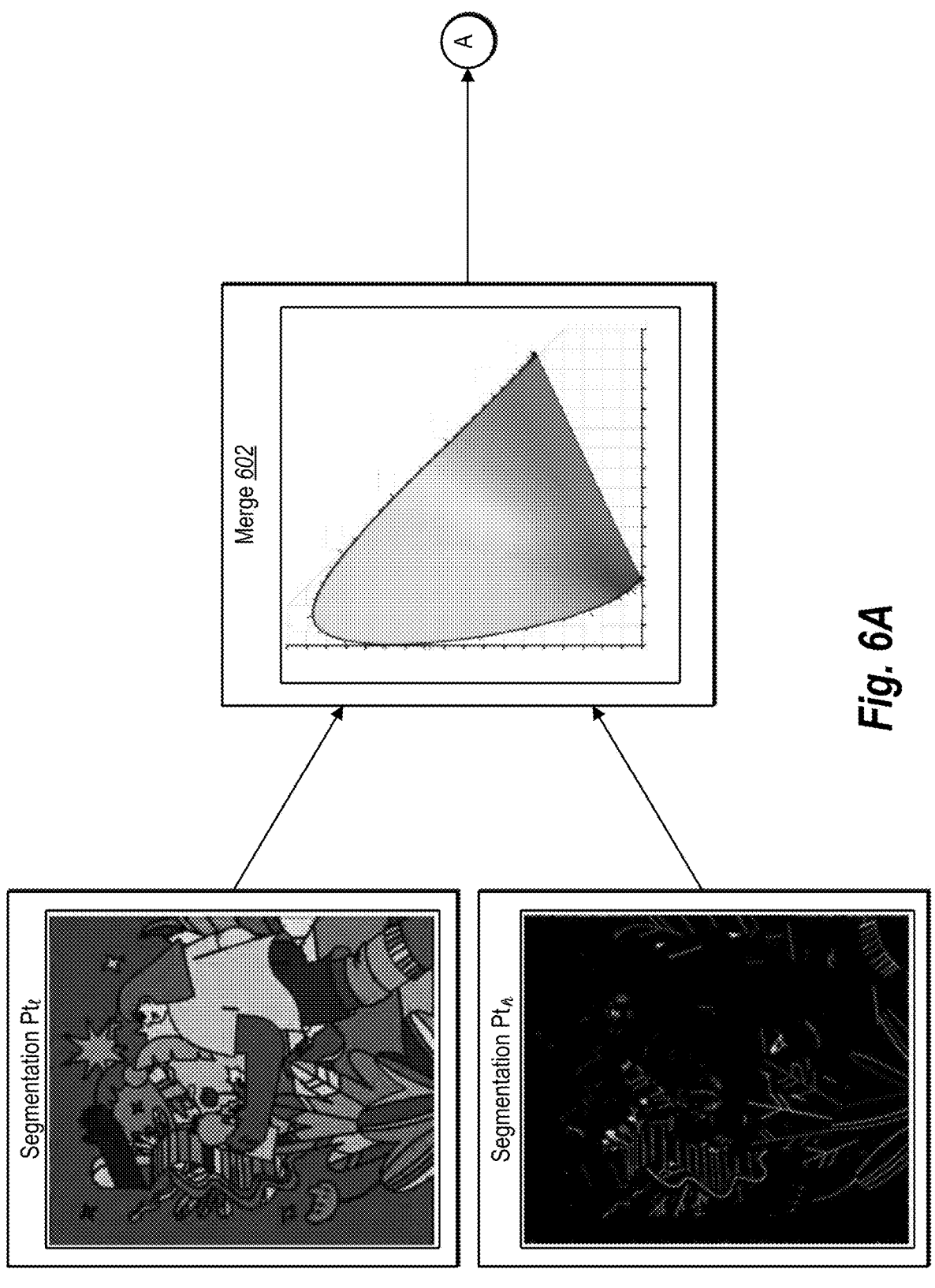
FIGS. 6A-6B illustrate an image vectorization system generating a set of segmented regions by merging fill functions in accordance with one or more implementations.

As shown in FIG. 6A, the image vectorization system 106 identifies (or obtains) a set of partitions $P_{t_\ell}$, that represent colorized regions of a set of smooth pixels $P_\ell$ using a set of fill functions $F_\ell$ as described above (e.g., in reference to FIGS. 4A-4B and 5A-5B). Moreover, as further shown in FIG. 6A, the image vectorization system 106 identifies (or obtains) a set of partitions $P_{t_h}$ that represent colorized regions of a set of high frequency pixels $P_h$ using a set of fill functions $F_h$ as described above (e.g., in reference to FIGS. 4A-4B and 5A-5B). Subsequently, in an act 602 of FIG. 6A, the image vectorization system 106 merges the set of partitions $P_{t_\ell}$ (via the set of fill functions $F_\ell$) and the set of partitions $P_{t_h}$ (via the set of fill functions $F_h$) to generate a set of segmented regions 604 (as shown in FIG. 6B). As further shown in the act 602 of FIG. 6A, in some cases, the image vectorization system 106 utilizes a color difference (or similarity) measure to merge the set of partitions $P_{t_\ell}$ and the set of partitions $P_{t_h}$ (e.g., via the set of fill functions $F_\ell$ and the set of fill functions $F_h$).

Figure 6B:
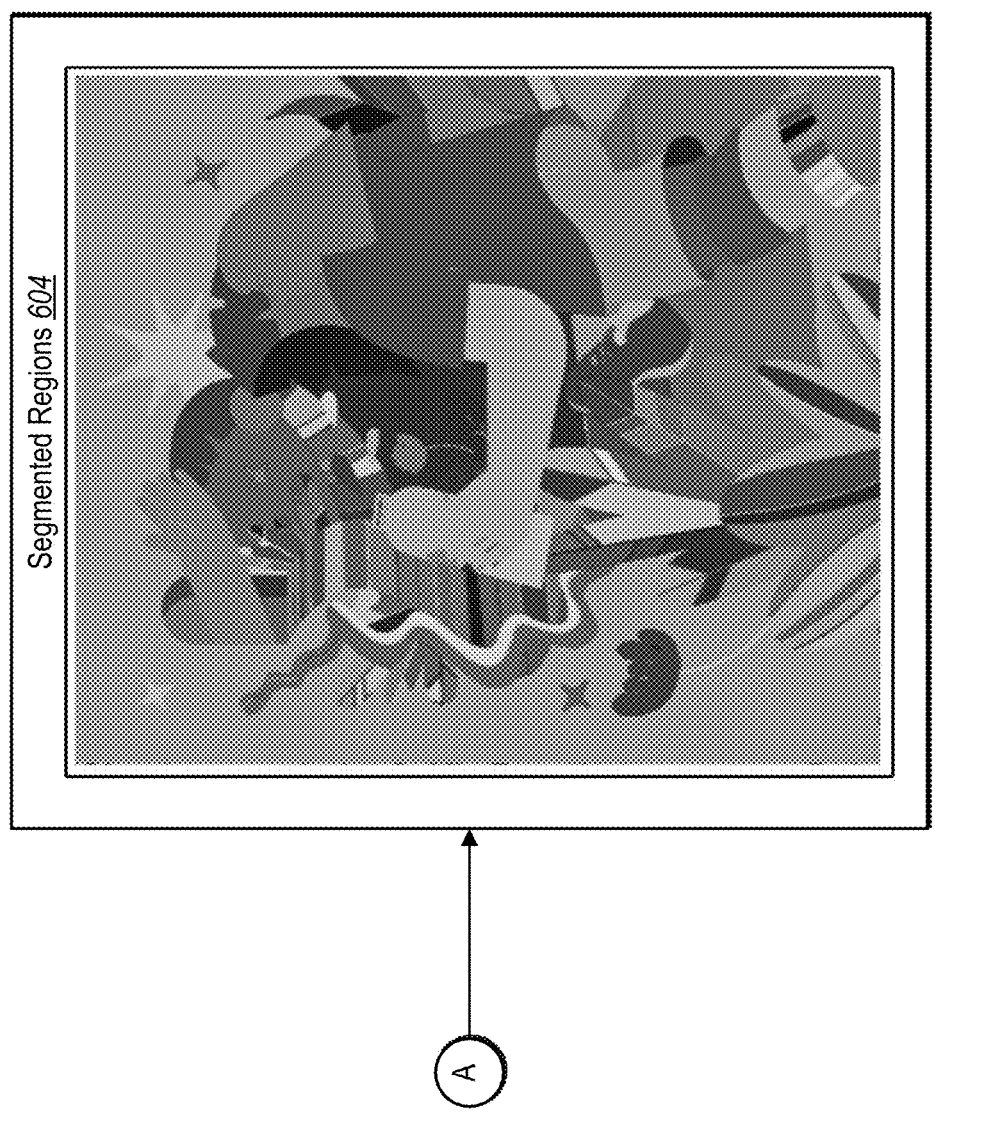

Moreover, as shown in FIG. 6B, the image vectorization system 106 generates the set of segmented regions 604 to represent various distinct shapes (e.g., segmentations) depicted in an image (e.g., a raster image). In particular, as shown in FIG. 6B, the image vectorization system 106 generates the set of segmented regions 604 to represent various segmented regions of a raster image through distinct colors. In some cases, the image vectorization system 106 utilizes segmentation IDs to indicate the various segmented regions in the set of segmented regions 604.

In one or more implementations, the image vectorization system 106 merges neighboring regions in the sets of partitions (or regions) corresponding to the fill functions for the set of smooth pixels $P_\ell$ and the set of high frequency pixels $P_h$. For example, the image vectorization system 106 utilizes color similarities between colors (from fill functions) corresponding to neighboring regions (or partitions) in the two sets of partitions ($P_{t_h}$ and $P_{t_\ell}$) to merge one or more neighboring regions (e.g., to reduce a number of segmented regions in a final set of segmented regions). In particular, in one or more instances, the image vectorization system 106 merges neighboring regions that are similar in color (e.g., similar to human perception via a color similarity measure).

For example, in some implementations, the image vectorization system 106 utilizes a CIEDE2000 color difference to measure closeness of two colors for the color similarity. Although one or more embodiments illustrate the image vectorization system 106 utilizing CIEDE2000 color difference, the image vectorization system 106, in one or more implementations, utilizes various color similarity measures, such as, but not limited, to, a CIELab measure and/or Euclidean distance measure between colors.

In some cases, the image vectorization system 106 also merges neighboring regions based on sizes of the regions (or partitions). For instance, the image vectorization system 106 utilizes varying thresholds that change based on the fill functions being compared and/or the size of the partitions (or regions) corresponding to the fill functions. In some cases, the image vectorization system 106 utilizes thresholds that inversely depend on the size of the partitions (or regions). For instance, the image vectorization system 106 utilizes thresholds and region size for merging as described below (e.g., with reference to functions (17) and (18)).

In some cases, the image vectorization system 106 merges regions in the set of partitions $P_{t_h}$ using higher thresholds of color similarity (e.g., to promote conservative merging in cases where color differences are less perceptible due to the small region sizes). Moreover, in some embodiments, the image vectorization system 106 merges regions in the set of partitions $P_{t_\ell}$ using thresholds of color similarity that promote merging neighboring regions that are similar (e.g., based on color differences with a larger region being more perceptible).

Moreover, in some implementations, the image vectorization system 106 also merges regions between the set of partitions $P_{t_\ell}$ and the set of partitions $P_{t_h}$. In some cases, the image vectorization system 106 merges the regions between the set of partitions $P_{t_\ell}$ and the set of partitions $P_{t_h}$ after separately merging one or more neighboring regions in the set of partitions $P_{t_\ell}$ and one or more neighboring regions in the set of partitions $P_{t_h}$. Indeed, in one or more instances, the image vectorization system 106 generates a set of segmented regions by merging a set of (colorized) partitions from the set of partitions $P_{t_\ell}$ and the set of partitions $P_{t_h}$ corresponding to the set of fill functions $F_\ell$ and the set of fill functions $F_h$ (in accordance with one or more implementations herein).

from the sets of fill functions ($F_\ell$ and $F_h$) by merging fill functions in accordance with the following algorithm:

| Algorithm 4 |
| --- |
| Require: F := {f₁, ... , f₂}<br>Ensure: F'<br>　　F' ← F<br>　　while ∃f₁, f₂ : f₁, f₂ ∈ Adj(F') and merge (f₁, f₂) do<br><br>　　　　F' ← F'\{f₁, f₂} ∪ {f₁₂}　　▷　$f_{12} := \dfrac{Dom(f_1)}{Dom(f_2)+Dom(f_1)}f_1 + \dfrac{Dom(f_2)}{Dom(f_2)+Dom(f_1)}f_2$ |

Indeed, in one or more implementations, the image vectorization system 106 merges neighboring regions in the sets of partitions (or regions) corresponding to the fill functions for the set of smooth pixels $P_\ell$ and the set of high frequency pixels $P_h$ to generate a set of segmented regions as described below (e.g., in reference to functions (17)-(18) and Algorithm 4).

For instance, from one or more fill functions in the set of fill functions $F_\ell$ corresponding to the set of partitions $P_{t_\ell}$ and/or the set of fill functions $F_h$ corresponding to the set of partitions $P_{t_h}$, the image vectorization system 106 merges fill functions (and corresponding regions) in accordance with the following function:

$$\text{merge}(f_1, f_2) := ciede2000(f_1 - f_2) \le \theta(f_1, f_2) \qquad (17)$$

In the above-mentioned function (17), in one or more instances, the image vectorization system 106 guides the merging utilizing a threshold based on (or dependent on) the participating fill functions. For instance, the image vectorization system 106 determines whether a color similarity measure difference is less than or equal to a threshold (as described above) determined using the participating fill functions utilizing attributes of the fill functions and/or corresponding regions (e.g., based on size, based on color, based on intensity).

For example, the image vectorization system 106 utilizes the participating fill functions in a step function to determine the threshold (e.g., $\theta(f_1, f_2)$). As an example, the image vectorization system 106 utilizes a step function with n steps in accordance with the following function:

$$\text{for a sequence } \{(s_i, v_i)\}_{0 \le i < n}, \text{ where } s_i < s_{i+1} \text{ and } v_i > v_{i+1} \qquad (18)$$

$$s := \min(Dom(f_1), Dom(f_2))$$

$$\theta(f_1, f_2) := \begin{cases} v_0 & \text{if } s \le s_0 \\ v_i & \text{else if } s_i \le s < s_{i+1} \\ v_{n-1} & \text{otherwise} \end{cases}$$

In some instances, in reference to the function (18), the image vectorization system 106 utilizes thresholds that are inversely dependent on a size of a domain (or region) of a fill function. In particular, in some instances, the image vectorization system 106 utilizes the threshold to conservatively merge color between larger regions (e.g., as color between larger regions is more perceptible compared to smaller regions).

In addition, in one or more implementations generates a set of segmented regions by merging regions (or partitions)

In one or more implementations, the image vectorization system 106 further utilizes a staggered merging scheme. For instance, the image vectorization system 106 first merges regions in the set of partitions $P_{t_h}$ corresponding to the fill functions $F_h$ utilizing aggressive thresholds (e.g., $\theta(f_1, f_2)$). Indeed, in one or more instances, merging the regions in the set of partitions $P_{t_h}$ using aggressive thresholds promotes extraction of thin and long (e.g., thin stroke) regions to conservatively preserve small salient regions. Indeed, in many cases, small salient regions in the set of partitions $P_{t_h}$ include small sized distinct regions. Then, the image vectorization system 106 merges regions in the set of partitions $P_{t_h}$ and the set of partitions $P_{t_\ell}$ using conservative thresholds (e.g., less than the aggressive thresholds used in the set of partitions $P_{t_h}$) in accordance with one or more implementations herein. For instance, the image vectorization system 106 merges the regions in the set of partitions $P_{t_h}$ and the set of partitions $P_{t_\ell}$ to generate a set of segmented regions (e.g., $P_{t'} = P_{t_\ell} \cup P_{t_h}$).

Additionally, as mentioned above, the image vectorization system 106 utilizes a set of segmented regions generated from a raster image (in accordance with one or more implementations herein) to generate a vector image. For instance, FIG. 7 illustrates the image vectorization system 106 generating a vector image from a raster image via a set of segmented regions.

Figure 7:
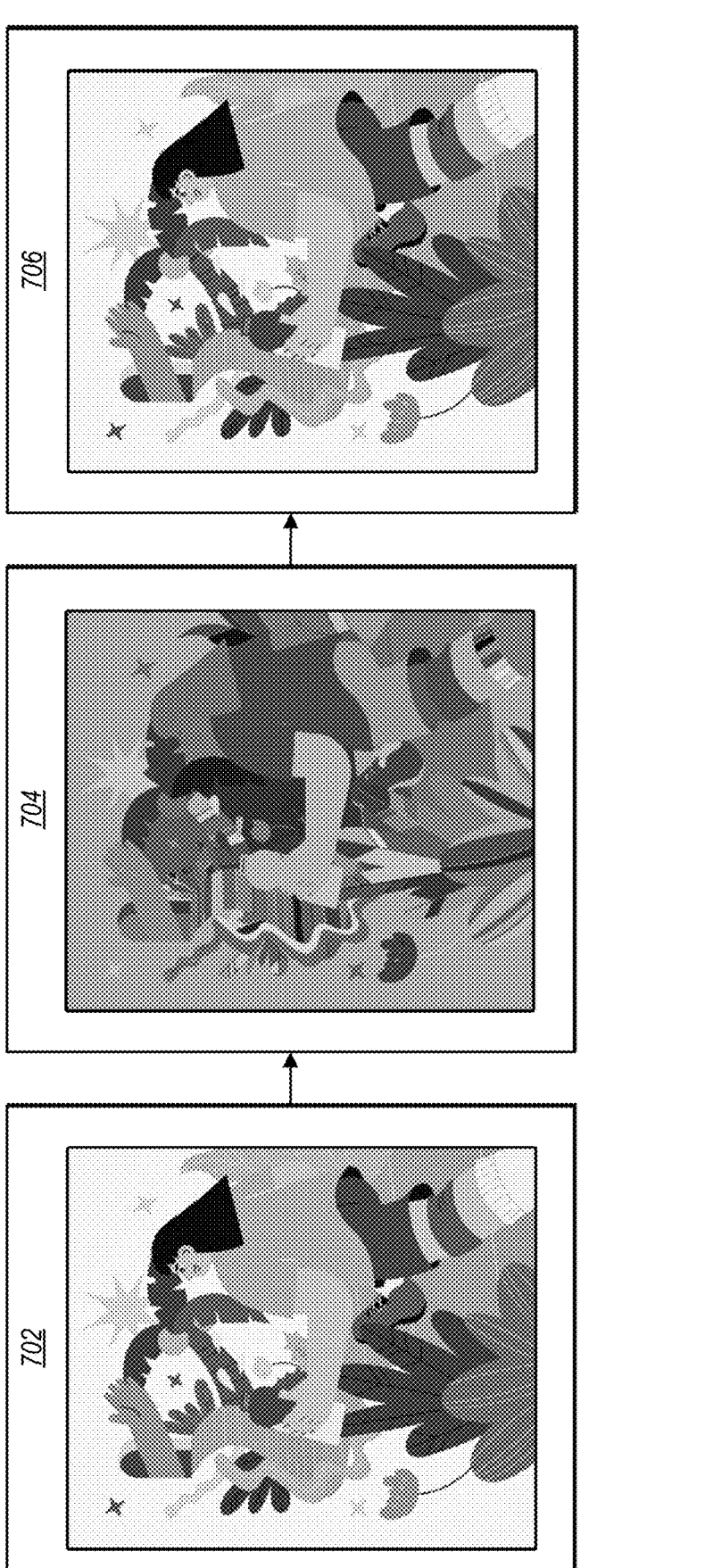
FIG. 7 illustrates an image vectorization system generating a vector image from a raster image via a set of segmented regions in accordance with one or more implementations.

As shown in FIG. 7, the image vectorization system 106 identifies (or obtains) a raster image 702. Furthermore, as shown in FIG. 7, the image vectorization system 106 generates a set of (colorized) segmented regions 704 for the raster image 702 in accordance with one or more implementations herein. Subsequently, as shown in FIG. 7, the image vectorization system 106 generates a vector image 706 based on the raster image 702 and the set of (colorized) segmented regions 704. Indeed, the image vectorization system 106 generates the vector image 706 that represents segmented regions of the raster image 702 in vector graphics format (e.g., as points, curves, lines) with the color content of each region.

Although one or more implementations illustrate the image vectorization system 106 utilizing segmentation to generate a vector image, in some cases, the image vectorization system 106 segments an image in accordance with one or more implementations herein to generate a set of segmented regions. In particular, in one or more instances, the image vectorization system 106 utilizes the set of segmented regions from an image for various tasks, such as, but not limited to, classification models, generative models, image modification, and/or image labeling.

Furthermore, in some cases, the image vectorization system 106 automatically (e.g., in the background) generates vector image from a raster image utilizing segmentation and vectorization in accordance with one or more implementations herein. For example, the image vectorization system 106 utilizes automatic vectorization in a text-to-image process. To illustrate, in some cases, the image vectorization system 106 receives a text (or speech) prompt requesting an image (with particular features) and utilizes a generative model (e.g., a diffusion model, a generative adversarial neural network) to generate an image from the text (or speech prompt). Subsequently, the image vectorization system 106 automatically generates a set of segmented regions for the raster image generated by the text-to-image model to generate a vector image in accordance with one or more implementations herein. Furthermore, the image vectorization system 106 outputs the generated vector image as an output for the text (or speech) prompt. Indeed, in one or more cases, the image vectorization system 106 provides, for display within a graphical user interface, the generated vector image.

As mentioned above, in one or more embodiments, the image vectorization system 106 generates accurate vector image outputs while efficiently utilizing a lesser number of paths. Indeed, experimenters utilized an implementation of the image vectorization system (as described above) to compare results with an existing image tracing system. For example, FIGS. 8A-8B illustrates the results of the experiments conducted by the experimenters using an implementation of the image vectorization system (as described above).

Figure 8A:
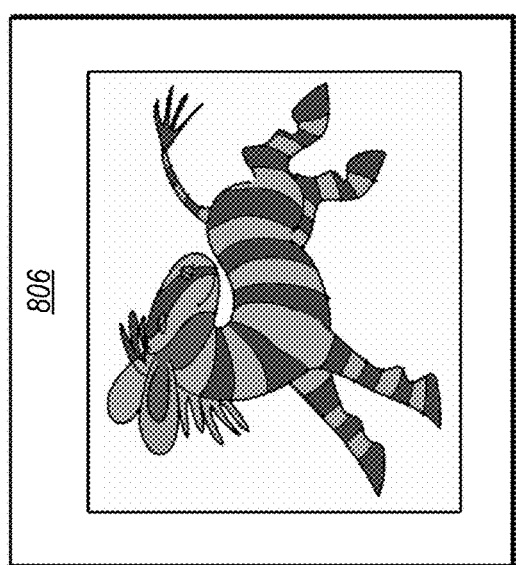
FIGS. 8A-8B illustrate experimental results of an image vectorization system in accordance with one or more implementations.
Figure 8A:
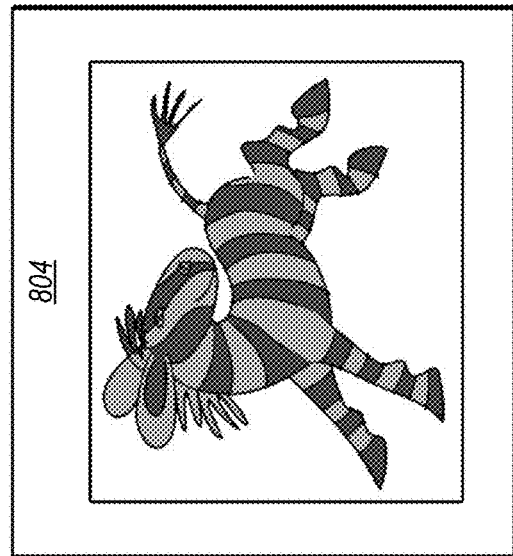
Figure 8A:
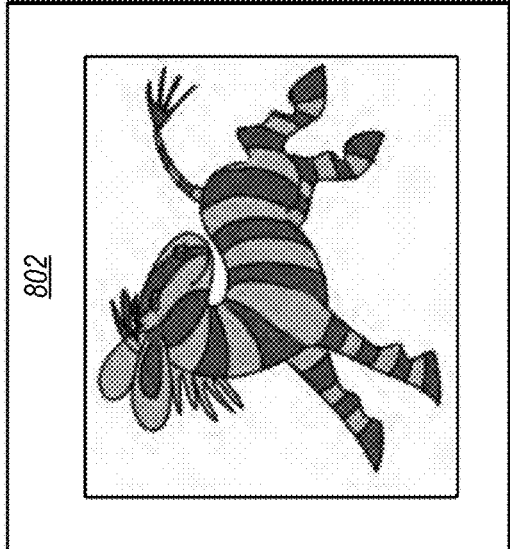

As shown in FIG. 8A, the experimenters utilized an implementation of the image vectorization system (as described above) to generate a vector image 804 and utilized an existing image tracing system to generate a vector image 806 as reconstructions of a raster image 802. As shown in FIG. 8A, the vector image 804 is an accurate reconstruction of the raster image 802. Indeed, in reference to FIG. 8A, the implementation of the image vectorization system generates efficient vector images as the vector image 804 (generated using an implementation of the image vectorization system) resulted in approximately 80 paths while the vector image 806 resulted in approximately 170 paths.

Figure 8B:
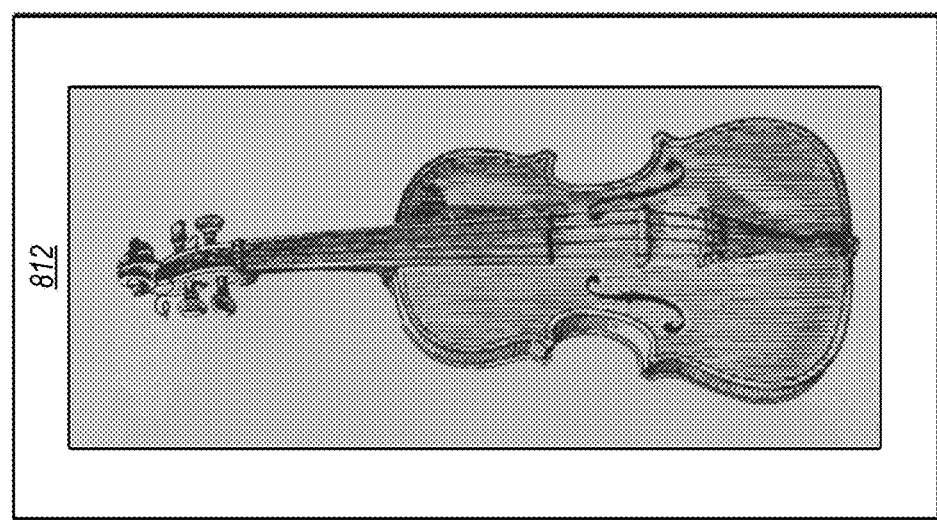
Figure 8B:
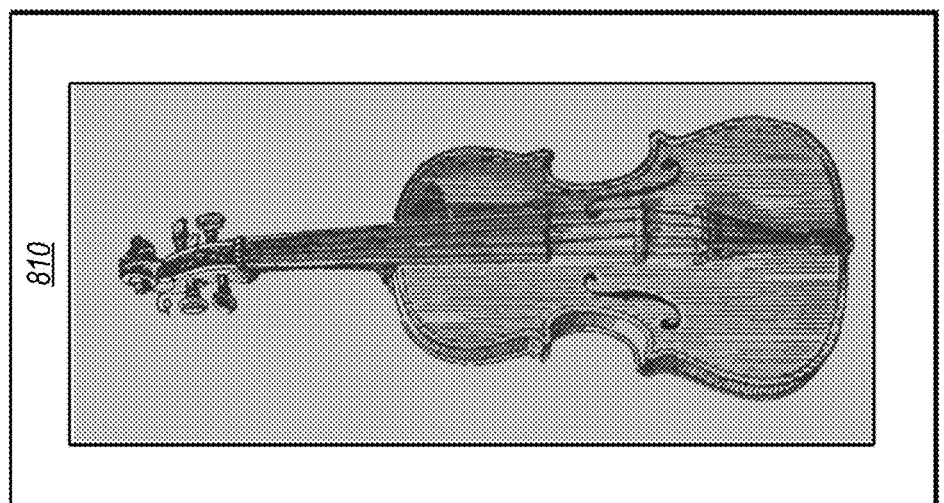
Figure 8B:
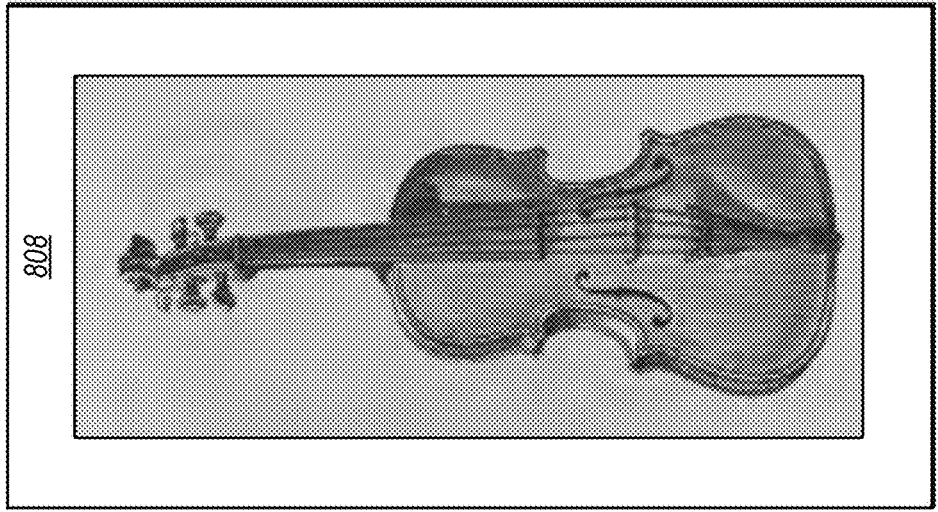

Furthermore, as shown in FIG. 8B, the experimenters utilized an implementation of the image vectorization system (as described above) to generate a vector image 810 and utilized an existing image tracing system to generate a vector image 812 as reconstructions of a raster image 808. As shown in FIG. 8B, the vector image 810 is an accurate reconstruction of the raster image 808. Indeed, in reference to FIG. 8B, the implementation of the image vectorization system generates efficient vector images as the vector image 810 (generated using an implementation of the image vectorization system) resulted in approximately 900 paths while the vector image 806 resulted in approximately 4000 paths.

Figure 9:
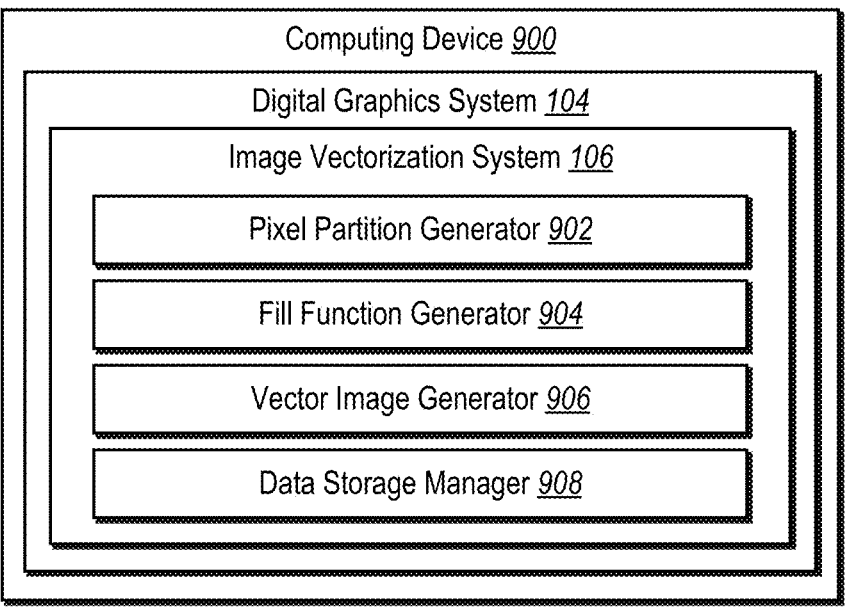
FIG. 9 illustrates a schematic diagram of an image vectorization system in accordance with one or more implementations.

Turning now to FIG. 9, additional detail will be provided regarding components and capabilities of one or more embodiments of the image vectorization system. In particular, FIG. 9 illustrates an example image vectorization system 106 executed by a computing device 900 (e.g., the server device(s) 102 and/or the client device 110). As shown by the embodiment of FIG. 9, the computing device 900 includes or hosts the digital graphics system 104 and the image vectorization system 106. Furthermore, as shown in FIG. 9, the digital graphics system 104 includes a pixel partition generator 902, a fill function generator 904, a vector image generator 906, and data storage manager 908.

As just mentioned, and as illustrated in the embodiment of FIG. 9, the image vectorization system 106 includes the pixel partition generator 902. For example, the pixel partition generator 902 utilizes a smoothing function to generate non-overlapping sets of pixels as described above (e.g., in relation to FIGS. 3A-3B and 4A-4B). In some instances, the pixel partition generator 902 generates a set of smooth pixels and a set of high frequency pixels from an image as described above (e.g., in relation to FIGS. 3A-3B and 4A-4B).

Moreover, as shown in FIG. 9, the image vectorization system 106 includes the fill function generator 904. In some cases, fill function generator 904 determines various partitions (or regions) from the non-overlapping set of smooth pixels and set of high frequency pixels utilizing pixel clustering as described above (e.g., in relation to FIGS. 3A-3B, 5A-5B, and 6A-6B). In addition, in one or more embodiments, the fill function generator 904 generates sets of fill function for the non-overlapping set of smooth pixels and a set of high frequency pixels utilizing the various partitions (or regions) as described above (e.g., in relation to FIGS. 3A-3B, 5A-5B, and 6A-6B). Additionally, the fill function generator 904 generates a set of segmented regions using the sets of fill functions and regions corresponding to the sets of fill functions as described above (e.g., in relation to FIGS. 3A-3B, 5A-5B, and 6A-6B).

Furthermore, as shown in FIG. 9, the image vectorization system 106 includes the vector image generator 906. In some embodiments, the vector image generator 906 generates a vector image from a raster image as described above (e.g., in relation to FIGS. 2, 3A-3B, and 7). In certain instances, the vector image generator 906 generates a vector image from a raster image utilizing a set of segmented regions (from the non-overlapping set of smooth pixels and set of high frequency pixels) as described above (e.g., in relation to FIGS. 2, 3A-3B, and 7).

As further shown in FIG. 9, the image vectorization system 106 includes the data storage manager 908. In some embodiments, the data storage manager 908 maintains data to perform one or more functions of the image vectorization system 106. For example, the data storage manager 908 includes raster images, vector images, pixel clusters, fill function data, pixel partition data (e.g., smooth pixels, high frequency pixels), image generative models, color similarity measure functions, and/or clustering functions.

Each of the components 902-908 of the computing device 900 (e.g., the computing device 900 implementing the image vectorization system 106), as shown in FIG. 9, may be in communication with one another using any suitable technology. The components 902-908 of the computing device 900 can comprise software, hardware, or both. For example, the components 902-908 can comprise one or more instructions stored on a computer-readable storage medium and executable by processor of one or more computing devices. When executed by the one or more processors, the computer-executable instructions of the image vectorization system 106 (e.g., via the computing device 900) can cause a client device and/or server device to perform the methods described herein. Alternatively, the components 902-908 and their corresponding elements can comprise hardware, such as a special purpose processing device to perform a certain function or group of functions. Additionally, the components 902-908 can comprise a combination of computer-executable instructions and hardware.

Furthermore, the components 902-908 of the image vectorization system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-908 may be implemented as a stand-alone application, such as a desktop or mobile application. Furthermore, the components 902-908 may be implemented as one or more web-based applications hosted on a remote server. The components 902-908 may also be implemented in a suite of mobile device applications or "apps." To illustrate, the components 902-908 may be implemented in an application, including but not limited to, ADOBE PHOTOSHOP, ADOBE PRE-MIERE, ADOBE LIGHTROOM, ADOBE ILLUSTRA-TOR, or ADOBE SUBSTANCE. "ADOBE," "ADOBE PHOTOSHOP," "ADOBE PREMIERE," "ADOBE LIGHT-ROOM," "ADOBE ILLUSTRATOR," or "ADOBE SUB-STANCE" are either registered trademarks or trademarks of Adobe Inc. in the United States and/or other countries.

Figure 10:
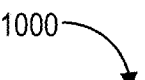
FIG. 10 illustrates a flowchart of series of acts for utilizing a segmentation approach that distinguishes between smooth-shaded regions from high-frequency regions in an image to generate a vector image in accordance with one or more implementations.
Figure 10:
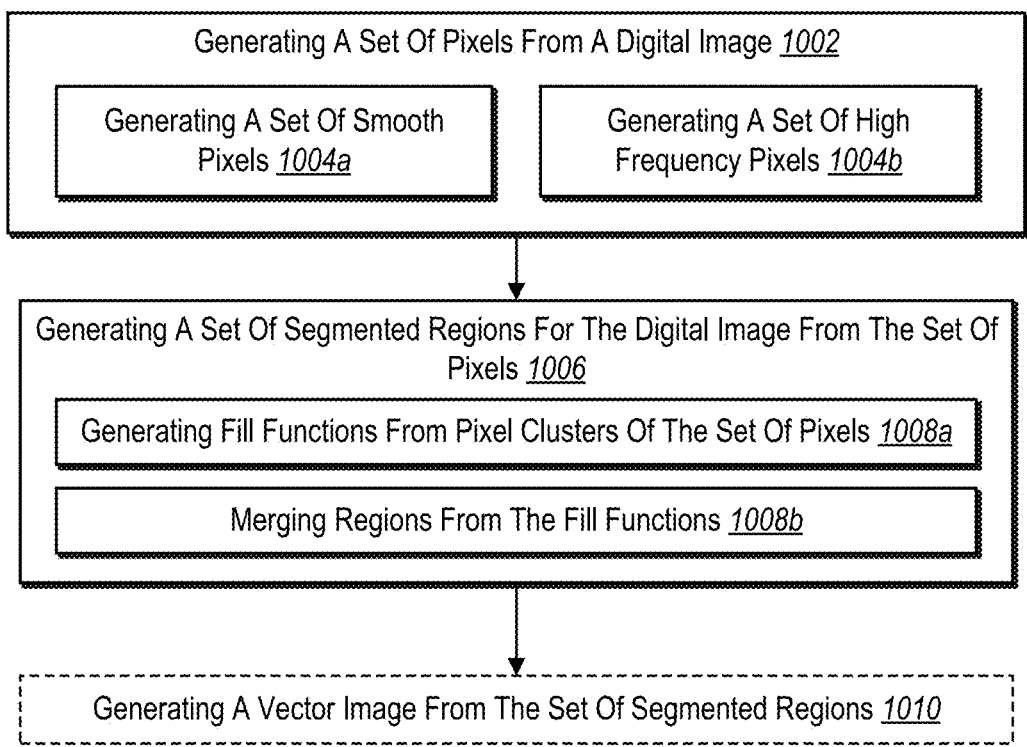

FIGS. 1-9, the corresponding text, and the examples provide a number of different methods, systems, devices, and non-transitory computer-readable media of the image vectorization system 106. In addition to the foregoing, one or more embodiments can also be described in terms of flowcharts comprising acts for accomplishing a particular result, as shown in FIG. 10. The acts shown in FIG. 10 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 10. In some embodiments, a system can be configured to perform the acts of FIG. 10. Alternatively, the acts of FIG. 10 can be performed as part of a computer implemented method.

As mentioned above, FIG. 10 illustrates a flowchart of a series of acts 1000 for utilizing a segmentation approach that distinguishes between smooth-shaded regions from high-frequency regions in an image within a vectorization pipeline to generate a vector image in accordance with one or more implementations. While FIG. 10 illustrates acts according to one embodiment, alternative embodiments may omit, add to, reorder, and/or modify any of the acts shown in FIG. 10.

As shown in FIG. 10, the series of acts 1000 include an act 1002 of generating a set of pixels from a digital image. In some cases, the act 1002 includes generating, from a set of pixels of the raster image, a set of smooth pixels and a set of high frequency pixels. Indeed, the act 1002 includes an act 1004a of generating a set of smooth pixels. For instance, the act 1004a includes generating, from a set of pixels of the digital image, a set of smooth pixels representing locally smooth pixel regions in the digital image. In some cases, the act 1004b includes generating a set of high frequency pixels. For example, the act 1004b includes generating, from the set of pixels of the digital image, a set of high frequency pixels representing boundary pixels in the digital image.

Furthermore, as shown in FIG. 10, the series of acts 1000 include an act 1006 of generating a set of segmented regions for the digital image from the set of pixels. In some cases, the act 1006 includes determining a set of segmented regions for the digital image by utilizing pixel clustering in the set of smooth pixels and the set of high frequency pixels. For instance, the act 1006 includes an act 1008a of generating fill functions from pixel clusters of the set pixels. In some cases, the act 1008a includes generating a first set of fill functions representing one or more colored regions in the set of smooth pixels by clustering one or more pixels in the set of smooth pixels based on color values of the one or more pixels. In addition, in one or more implementations, the act 1008a includes generating a second set of fill functions representing one or more additional colored regions in the set of high frequency pixels by clustering one or more additional pixels in the set of high frequency pixels based on additional color values of the one or more additional pixels.

Furthermore, the act 1006 includes an act 1008b of merging regions from the fill functions. For example, the act 1008b includes determining a set of segmented regions for the raster image utilizing a first set of fill functions from pixel clusters in the set of smooth pixels and a second set of fill functions from additional pixel clusters in the set of high frequency pixels. In some instances, the act 1008b includes merging the one or more colored regions from the first set of fill functions and the one or more additional colored regions from the second set of fill functions based on color similarity.

In some embodiments, as shown in FIG. 10, the series of acts 1000 include an act 1010 of generating a vector image from the set of segmented regions. In one or more embodiments, the act 1010 includes receiving a request to convert a raster image into a vector image. Moreover, in one or more instances, the act 1010 includes generating the vector image based on the set of segmented regions. In some cases, the act 1010 includes converting the digital image to a vector image based on the set of segmented regions. In some cases, the act 1010 includes generating a vector image for the digital image based on the set of segmented regions.

In one or more embodiments, the series of acts 1000 include generating the set of smooth pixels by identifying locally smooth pixels in the raster (or digital) image from a smoothing function. Moreover, in one or more instances, the series of acts 1000 include generating the set of high frequency pixels by identifying boundary pixels with color value variations in the raster (or digital) image from a smoothing function. In some cases, the series of acts 1000 include generating the set of smooth pixels and the set of high frequency pixels utilizing a smoothing function on the digital image.

Moreover, in some instances, the series of acts 1000 include determining the pixel clusters in the set of smooth pixels based on color values of pixels in the set of smooth pixels and a first radius. Furthermore, in some implementations, the series of acts 1000 include determining the additional pixel clusters in the set of high frequency pixels based on additional color values of additional pixels in the set of high frequency pixels and a second radius. In one or more instances, the series of acts 1000 include determining pixel clusters in the set of smooth pixels based on color values of pixels in the set of smooth pixels. Moreover, in some cases, the series of acts 1000 include determining additional pixel clusters in the set of high frequency pixels based on additional color values of additional pixels in the set of high frequency pixels.

In some cases, the series of acts 1000 include clustering the one or more pixels in the set of smooth pixels utilizing mean shift color clustering with a first radius. Moreover, in some implementations, the series of acts 1000 include clustering the one or more additional pixels in the set of high frequency pixels utilizing mean shift color clustering with a second radius, wherein the first radius is different from the second radius. Additionally, in one or more embodiments, the series of acts 1000 include generating the first set of fill functions by utilizing color value averages corresponding to one or more pixel clusters in the set of smooth pixels. Moreover, in some embodiments, the series of acts 1000 include generating the second set of fill functions by utilizing color value averages corresponding to one or more pixel clusters in the set of high frequency pixels.

In one or more embodiments, the series of acts 1000 include generating the first set of fill functions by assigning colors to the pixel clusters utilizing representative colors from the pixel clusters. Moreover, in some cases, the series of acts 1000 include generating the second set of fill functions by assigning additional colors to the additional pixel clusters utilizing additional representative colors from the additional pixel clusters. Additionally, in some cases, the series of acts 1000 include determining the representative colors from the pixel clusters utilizing average colors from the pixel clusters. Furthermore, in some instances, the series of acts 1000 include determining the average colors from the pixel clusters utilizing the color values of the pixels weighted based on distances of the pixels to boundary pixels.

In some implementations, the series of acts 1000 include determining the set of segmented regions by merging partitions from the pixel clusters corresponding to the first set of fill functions and additional partitions from the additional pixel clusters corresponding to the second set of fill functions based on color similarities. Additionally, the series of acts 1000 include merging the partitions and the additional partitions based on region sizes of the partitions and the additional partitions. In some embodiments, the series of acts 1000 include determining the set of segmented regions for the digital image utilizing a first set of fill functions for the pixel clusters and a second set of fill functions for the additional pixel clusters.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
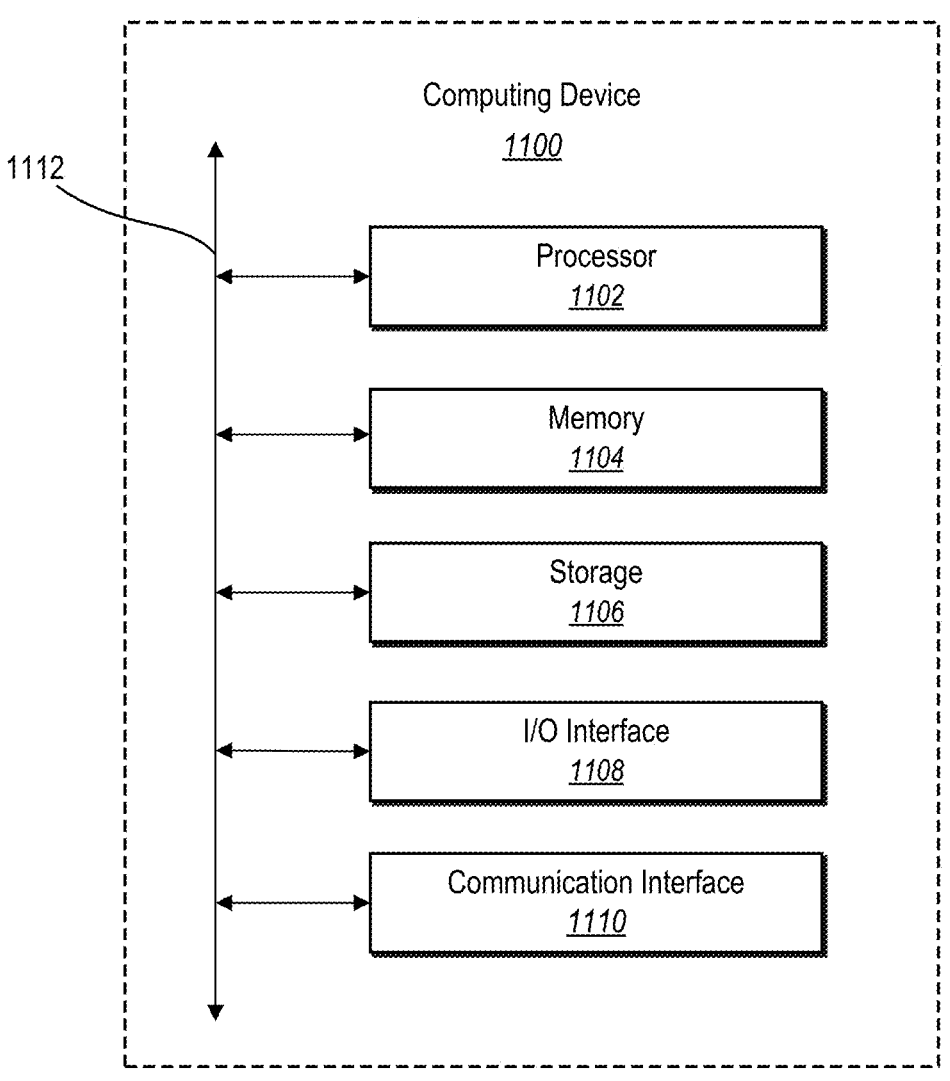
FIG. 11 illustrates a block diagram of an example computing device in accordance with one or more implementations.

FIG. 11 illustrates a block diagram of an example computing device 1100 that may be configured to perform one or more of the processes described above. One will appreciate that one or more computing devices, such as the computing device 1100 may represent the computing devices described above (e.g., the server device(s) 102 and/or the client device 110). In one or more implementations, the computing device 1100 may be a mobile device (e.g., a mobile telephone, a smartphone, a PDA, a tablet, a laptop, a camera, a tracker, a watch, a wearable device, etc.). In some implementations, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other implementations. Furthermore, in certain implementations, the computing device 1100 includes fewer components than those shown in FIG. 11. Components of the computing device 1100 shown in FIG. 11 will now be described in additional detail.

In particular implementations, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive ("HDD"), flash memory, a Universal Serial Bus ("USB") drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller ("NIC") or network adapter for communicating with an Ethernet or other wire-based network or a wireless NIC ("WNIC") or wireless adapter for communicating with a wireless network, such as a WI-FI. The computing device 1110 can further include a bus 1112. The bus 1112 can include hardware, software, or both that connects components of the computing device 1100 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause the at least one processor to perform operations comprising:

receiving a request to convert a raster image into a vector image;

generating, from a set of pixels of the raster image, a set of smooth pixels and a set of high frequency pixels;

determining a set of segmented regions for the raster image by:

generating a first set of fill functions representing one or more colored regions from pixel clusters in the set of smooth pixels by determining average colors from the pixel clusters utilizing color values of pixels in the set of smooth pixels weighted based on distances of the pixels to boundary pixels;

generating a second set of fill functions representing one or more additional colored regions from additional pixel clusters in the set of high frequency pixels; and merging the one or more colored regions from the first set of fill functions with the one or more additional colored regions from the second set of fill functions based on color similarity; and generating the vector image based on the set of segmented regions.

2. The non-transitory computer-readable medium of claim 1, wherein the operations further comprise generating the set of smooth pixels by identifying locally smooth pixels in the raster image from a smoothing function.

3. The non-transitory computer-readable medium of claim 1, wherein the operations further comprise generating the set of high frequency pixels by identifying boundary pixels with color value variations in the raster image from a smoothing function.

4. The non-transitory computer-readable medium of claim 1, wherein the operations further comprise:

determining the pixel clusters in the set of smooth pixels based on color values of pixels in the set of smooth pixels and a first radius; and determining the additional pixel clusters in the set of high frequency pixels based on additional color values of additional pixels in the set of high frequency pixels and a second radius.

5. The non-transitory computer-readable medium of claim 4, wherein the operations further comprise:

generating the first set of fill functions by assigning colors to the pixel clusters utilizing representative colors from the pixel clusters; and generating the second set of fill functions by assigning additional colors to the additional pixel clusters utilizing additional representative colors from the additional pixel clusters.

6. The non-transitory computer-readable medium of claim 5, wherein the operations further comprise determining the representative colors from the pixel clusters utilizing average colors from the pixel clusters.

7. The non-transitory computer-readable medium of claim 1, further comprising dilating the boundary pixels by expanding the second set of fill functions to include neighboring pixels within a threshold distance of the set of high frequency pixels.

8. The non-transitory computer-readable medium of claim 1, wherein the operations further comprise determining the set of segmented regions by merging partitions from the pixel clusters corresponding to the first set of fill functions and additional partitions from the additional pixel clusters corresponding to the second set of fill functions based on color similarities.

9. The non-transitory computer-readable medium of claim 8, wherein the operations further comprise merging the partitions and the additional partitions based on region sizes of the partitions and the additional partitions.

10. A system comprising:

a memory component comprising a digital image; and a processing device coupled to the memory component, the processing device to perform operations comprising:

generating, from a set of pixels of the digital image, a set of smooth pixels representing locally smooth pixel regions in the digital image;

generating, from the set of pixels of the digital image, a set of high frequency pixels representing boundary pixels in the digital image;

determining a set of segmented regions for the digital image by:

generating a first set of fill functions representing one or more colored regions by utilizing pixel clustering in the set of smooth pixels by determining average colors from pixel clusters utilizing color values of pixels in the set of smooth pixels weighted based on distances of the pixels to boundary pixels;

generating a second set of fill functions representing one or more additional colored regions by utilizing pixel clustering in the set of high frequency pixels; and merging the one or more colored regions from the first set of fill functions with the one or more additional colored regions from the second set of fill functions based on color similarity; and converting the digital image to a vector image based on the set of segmented regions.

11. The system of claim 10, wherein the operations further comprise generating the set of smooth pixels and the set of high frequency pixels utilizing a smoothing function on the digital image.

12. The system of claim 10, wherein the operations further comprise:

determining pixel clusters in the set of smooth pixels based on color values of pixels in the set of smooth pixels; and determining additional pixel clusters in the set of high frequency pixels based on additional color values of additional pixels in the set of high frequency pixels.

13. The system of claim 12, wherein the operations further comprise determining the set of segmented regions for the digital image utilizing the first set of fill functions for the pixel clusters and the second set of fill functions for the additional pixel clusters.

14. The system of claim 13, wherein the operations further comprise:

generating the first set of fill functions by assigning colors to the pixel clusters utilizing representative colors from the pixel clusters; and generating the second set of fill functions by assigning additional colors to the additional pixel clusters utilizing additional representative colors from the additional pixel clusters.

15. The system of claim 13, wherein the operations further comprise determining the set of segmented regions for the digital image by merging partitions from the pixel clusters corresponding to the first set of fill functions and additional partitions from the additional pixel clusters corresponding to the second set of fill functions based on color similarities.

16. A computer-implemented method comprising:

generating, from a set of pixels of a digital image, a set of smooth pixels and a set of high frequency pixels; and determining a set of segmented regions for the digital image by:

generating a first set of fill functions representing one or more colored regions in the set of smooth pixels by clustering one or more pixels in the set of smooth pixels by determining average color values of the one or more pixels in the set of smooth pixels weighted based on distances of the one or more pixels to boundary pixels;

generating a second set of fill functions representing one or more additional colored regions in the set of high frequency pixels by clustering one or more additional pixels in the set of high frequency pixels based on additional color values of the one or more additional pixels; and merging the one or more colored regions from the first set of fill functions with the one or more additional colored regions from the second set of fill functions based on color similarity.

17. The computer-implemented method of claim 16, further comprising:

generating the set of smooth pixels by identifying locally smooth pixels in the digital image from a smoothing function; and generating the set of high frequency pixels by identifying boundary pixels with color value variations in the digital image from the smoothing function.

18. The computer-implemented method of claim 16, further comprising:

clustering the one or more pixels in the set of smooth pixels utilizing mean shift color clustering with a first radius; and clustering the one or more additional pixels in the set of high frequency pixels utilizing mean shift color clustering with a second radius, wherein the first radius is different from the second radius.

19. The computer-implemented method of claim 16, further comprising generating the first set of fill functions by utilizing color value averages corresponding to one or more pixel clusters in the set of smooth pixels.

20. The computer-implemented method of claim 16, further comprising generating a vector image for the digital image based on the set of segmented regions.

* * * * *